(12) United States Patent
Peterson et al.

(10) Patent No.: US 7,253,954 B2
(45) Date of Patent: Aug. 7, 2007

(54) FLAT VALLEY FRESNEL LENS

(75) Inventors: Mark David Peterson, Lake Oswego, OR (US); Jeffrey Alan Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/457,117

(22) Filed: Jul. 12, 2006

(65) Prior Publication Data

US 2006/0245055 A1 Nov. 2, 2006

Related U.S. Application Data

(63) Continuation of application No. 10/753,985, filed on Jan. 6, 2004, now Pat. No. 7,102,820, which is a continuation-in-part of application No. 10/693,615, filed on Oct. 23, 2003, now Pat. No. 7,088,507, which is a continuation-in-part of application No. 10/222,083, filed on Aug. 16, 2002, now Pat. No. 6,896,375.

(51) Int. Cl.
*G03B 21/56* (2006.01)
*G03B 21/60* (2006.01)
*G03B 21/28* (2006.01)
*G02B 3/08* (2006.01)

(52) U.S. Cl. .................. 359/457; 359/449; 359/459; 359/460; 359/742; 353/66; 353/78

(58) Field of Classification Search ........... 359/449, 359/454–457, 459–460, 741–743; 353/66, 353/77–78
See application file for complete search history.

(56) References Cited

U.S. PATENT DOCUMENTS

| | | | |
|---|---|---|---|
| 3,485,165 A | 12/1969 | Hughes | |
| 4,674,836 A | 6/1987 | Yata et al. | |
| 4,729,631 A | 3/1988 | Takahashi et al. | |
| 4,730,897 A | 3/1988 | McKechnie et al. | |
| 4,773,731 A | 9/1988 | Goldenberg et al. | |
| 4,880,292 A | 11/1989 | Kageyama et al. | |
| 4,921,330 A | 5/1990 | Takahashi et al. | |
| 4,927,248 A * | 5/1990 | Sakakibara et al. ......... 359/742 |

(Continued)

FOREIGN PATENT DOCUMENTS

JP 5119283 5/1993

OTHER PUBLICATIONS

H. Kanayama, et al., "A New LC Rear-Projection Display Based on the Aspherical Mirror Projection System," IDW, 2000, pp. 1041-1044, Sanyo Electric Co., Ltd., Osaka Japan.

(Continued)

*Primary Examiner*—W. B. Perkey
*Assistant Examiner*—Magda Cruz
(74) *Attorney, Agent, or Firm*—Alleman Hall McCoy Russell & Tuttle LLP

(57) ABSTRACT

A Fresnel lens. The Fresnel lens includes an input side configured to receive the image and an output side, opposite the input side, configured to display the image. The input side includes a first facet angled to receive input light constituting at least a portion of the image. The input side also includes a second facet at least partially facing the first facet and a third facet linking the first facet to the second facet, wherein the third facet and the output side are substantially parallel.

20 Claims, 24 Drawing Sheets

U.S. PATENT DOCUMENTS

| | | | |
|---|---|---|---|
| 4,936,657 A | 6/1990 | Tejima et al. | |
| 4,979,801 A | 12/1990 | Park | |
| RE33,795 E | 1/1992 | Ogino | |
| 5,100,222 A | 3/1992 | Minoura et al. | |
| 5,302,983 A | 4/1994 | Sato et al. | |
| 5,422,691 A | 6/1995 | Ninomiya et al. | |
| 5,442,413 A | 8/1995 | Tejima et al. | |
| 5,442,484 A | 8/1995 | Shikawa | |
| 5,489,940 A | 2/1996 | Richardson et al. | |
| 5,495,306 A | 2/1996 | Shibazaki | |
| 5,699,131 A | 12/1997 | Aoki et al. | |
| 5,710,668 A | 1/1998 | Gohman et al. | |
| 5,716,118 A | 2/1998 | Sato et al. | |
| 5,724,195 A | 3/1998 | Enomoto et al. | |
| 5,760,973 A | 6/1998 | Kawamura | |
| 5,796,528 A | 8/1998 | Mihara | |
| 5,805,359 A | 9/1998 | Yamanashi | |
| 5,818,639 A | 10/1998 | Furuya | |
| 5,820,240 A | 10/1998 | Ohzawa | |
| 5,833,339 A * | 11/1998 | Sarayeddine | 353/20 |
| 5,870,234 A | 2/1999 | Ebbesmeier nee Schitthof | |
| 5,914,760 A * | 6/1999 | Daiku | 349/65 |
| 5,923,479 A | 7/1999 | Nagata | |
| 5,978,051 A | 11/1999 | Gohman et al. | |
| 5,999,332 A | 12/1999 | Ohno | |
| 6,016,229 A | 1/2000 | Suzuki | |
| 6,018,425 A | 1/2000 | Nakabayashi et al. | |
| 6,038,085 A | 3/2000 | Nakazawa | |
| 6,046,859 A | 4/2000 | Raj | |
| 6,052,226 A | 4/2000 | Takahashi | |
| 6,053,615 A | 4/2000 | Peterson et al. | |
| 6,081,380 A | 6/2000 | Ohshima et al. | |
| 6,084,707 A | 7/2000 | Maruyama et al. | |
| 6,088,172 A | 7/2000 | Sato | |
| 6,111,701 A | 8/2000 | Brown | |
| 6,123,425 A | 9/2000 | Ohzawa | |
| 6,129,552 A | 10/2000 | Deshoux et al. | |
| 6,137,638 A | 10/2000 | Yamagishi et al. | |
| 6,144,503 A | 11/2000 | Sugano | |
| 6,147,812 A | 11/2000 | Narimatsu et al. | |
| 6,188,523 B1 | 2/2001 | Choi | |
| 6,201,647 B1 | 3/2001 | Ohzawa | |
| 6,236,511 B1 | 5/2001 | Brown | |
| 6,273,338 B1 | 8/2001 | White | |
| 6,299,313 B1 | 10/2001 | Hirata et al. | |
| 6,301,058 B2 | 10/2001 | Nagahara | |
| 6,307,675 B1 | 10/2001 | Abe et al. | |
| 6,348,993 B1 | 2/2002 | Hori | |
| 6,353,509 B1 | 3/2002 | Nakazawa | |
| 6,366,400 B1 | 4/2002 | Ohzawa | |
| 6,384,987 B1 | 5/2002 | Sensui | |
| 6,396,641 B2 | 5/2002 | Hirata et al. | |
| 6,400,504 B2 | 6/2002 | Miyata | |
| 6,406,150 B1 | 6/2002 | Burstyn | |
| 6,407,859 B1 | 6/2002 | Hennen et al. | |
| 6,407,860 B1 | 6/2002 | Funazaki et al. | |
| 6,416,181 B1 | 7/2002 | Kessler et al. | |
| 6,417,966 B1 | 7/2002 | Moshrefzadeh et al. | |
| 6,419,365 B1 | 7/2002 | Potekev et al. | |
| 6,471,359 B1 | 10/2002 | Kim et al. | |
| 6,473,236 B2 | 10/2002 | Tadic-Galeb et al. | |
| 6,485,145 B1 | 11/2002 | Cotton et al. | |
| 6,493,032 B1 | 12/2002 | Wallerstein et al. | |
| 6,513,935 B2 | 2/2003 | Ogawa | |
| 6,561,649 B1 | 5/2003 | Burstyn | |
| 6,624,952 B2 | 9/2003 | Kuwa et al. | |
| 6,626,541 B2 | 9/2003 | Sunaga | |
| 6,652,104 B2 | 11/2003 | Nishida et al. | |
| 6,752,500 B1 | 6/2004 | Yoshii et al. | |
| 6,768,594 B2 | 7/2004 | Imafuku et al. | |
| 6,788,460 B2 | 9/2004 | Knox et al. | |
| 6,804,055 B2 | 10/2004 | Peterson et al. | |
| 6,808,271 B1 * | 10/2004 | Kurematsu | 353/70 |
| 6,813,094 B2 | 11/2004 | Kaminsky et al. | |
| 6,853,493 B2 | 2/2005 | Kreitzer | |
| 6,877,862 B2 | 4/2005 | Fukunaga et al. | |
| 6,880,934 B2 | 4/2005 | Lee | |
| 6,883,920 B2 | 4/2005 | Chen | |
| 2002/0008853 A1 | 1/2002 | Sunaga | |
| 2002/0044263 A1 | 4/2002 | Takeuchi | |
| 2003/0025885 A1 | 2/2003 | Cotton et al. | |
| 2003/0038999 A1 | 2/2003 | Knox et al. | |
| 2003/0053206 A1 | 3/2003 | Togino | |
| 2003/0169513 A1 | 9/2003 | Kaminsky et al. | |
| 2003/0231261 A1 | 12/2003 | Bassi et al. | |
| 2004/0001254 A1 | 1/2004 | Shimizu | |
| 2004/0227990 A1 | 11/2004 | Peterson et al. | |

OTHER PUBLICATIONS

J. Ouellette, "Digital Displays with Micromirror Devices," American Institute of Physics, Jun. 1997, pp. 9-11.

J. Shinozaki, et al. "15.3: A 50-in. Ultra-Slim Liquid-Crystal Rear Projector," SID 92 Digest, 1992, pp. 273-276, Seiko Epson Corp., Tokyo, Japan.

* cited by examiner

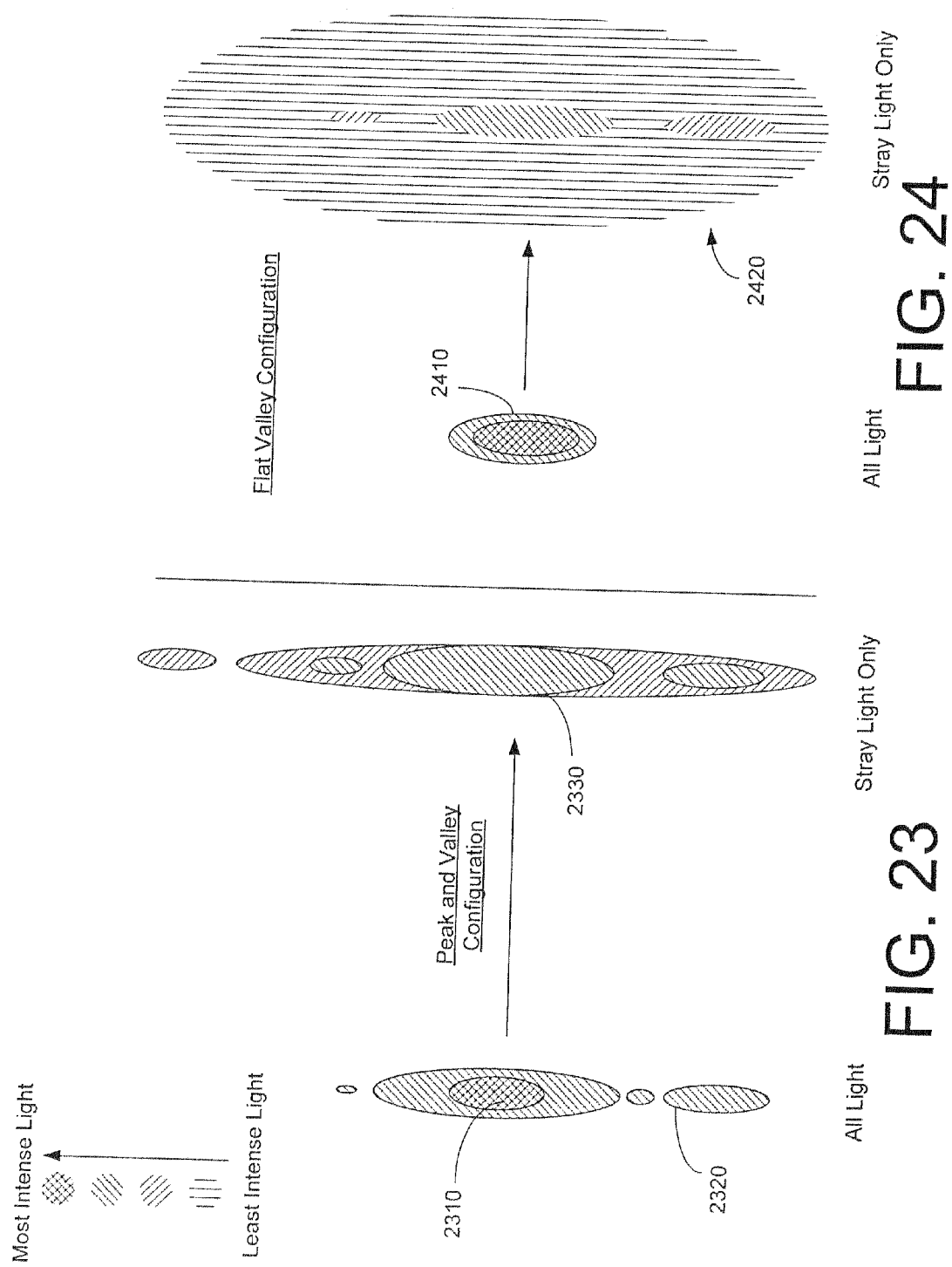

FLAT VALLEY FRESNEL LENS

CROSS-REFERENCE TO RELATED APPLICATIONS

This application is a continuation of and claims priority to U.S. patent application Ser. No. 10/753,985 filed Jan. 6, 2004, now U.S. Pat. No. 7,102,820 which is a Continuation-in-Part of U.S. patent application Ser. No. 10/693,615 filed Oct. 23, 2003, now U.S. Pat. No. 7,088,507 which is a Continuation-in-Part of U.S. patent application Ser. No. 10/222,083, now U.S. Pat. No. 6,896,375, filed Aug. 16, 2002. The contents of the above are incorporated by reference in their entirety for all purposes.

BACKGROUND

In order to provide a television with a screen size greater than approximately 40 inches a display device other than a direct view cathode ray tube (CRT) is typically used. As the screen size of a CRT increases, so too does the depth. It is generally accepted that for screen sizes greater than 40 inches direct view CRTs are no longer practical. Three alternatives exist for large screen (>40 inch screen size) displays: projection displays, plasma displays, and Liquid Crystal Displays (LCDs).

Current plasma and LCD displays are much more expensive than projection displays. Plasma and LCD displays are generally thin enough to mount on a wall, but can be heavy enough that mounting can be difficult. For example, current 42-inch plasma displays can weigh 80 pounds or more and 60-inch plasma displays can weigh 150 pounds or more. One advantage of plasma and LCD displays over current projection displays is that they are typically much thinner than current projection displays having the same screen size.

Projection displays, specifically rear projection displays, are typically more cost-effective then plasma displays. Projection displays may also consume too much space in a room to provide a practical solution for large screen needs. For example, typical 60-inch rear projection displays are 24 inches thick and can weigh 200 to 300 pounds.

FIG. 1 illustrates a prior art rear projection display device. In general, display device 100 includes optical engine 140, projection lens 130, back plate mirror 120 and screen 110. Optical engine 140 generates an image to be projected on screen 110. Projection lens 130 projects the image from optical engine 140 on to back plate mirror 120, which reflects the image to screen 110. The size of display device 100 is proportional to the size of the image to be displayed on screen 110. Thus, for large screen sizes (e.g., >60 inches), the overall size of display device 100 can be very large.

Fresnel lenses may be used to direct a projected image toward a viewer. Conventional rear projection display devices are thick because of surface reflections from the Fresnel surface. As the angle of incidence increases (on the flat side of the Fresnel) the amount of light that is reflected from the air-plastic interface also increases, reducing image uniformity. A person of ordinary skill in the art is familiar with calculating Fresnel surface reflections.

FIG. 2 illustrates a conventional rear projection display device 200 that is implemented with a Fresnel lens. Conventional rear projection display device 200 includes: optical engine 210, projection lens 220, Fresnel lens 230, and diffusion screen 240. The light impinging on the transmission surface of Fresnel lens 230 may be roughly symmetric with respect to optical axis 250. The use of such Fresnel lenses may generate light artifacts, such as stray light. These light artifacts may affect the quality of a displayed image.

BRIEF DESCRIPTION OF THE DRAWINGS

The invention is illustrated by way of example, and not by way of limitation, in the figures of the accompanying drawings in which like reference numerals refer to similar elements.

FIG. 23 is a plot of light patterns for a fist pixel where the light patterns are produced using a Fresnel lens of a first configuration.

FIG. 24 is a plot of light patterns for a fist pixel where the light patterns are produced using a Fresnel lens of a second configuration.

DETAILED DESCRIPTION

An ultra-thin rear projection display system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The ultra-thin rear projection display device described herein includes a wide-angle lens system and one or more planar mirrors that are parallel to a screen on which an image is to be displayed. In one embodiment, the screen that has multiple groove angles to provide better illumination than screens with a single groove angle. As described in greater detail below, the screen may be a Fresnel lens having one or more groove angles.

Figure 1:
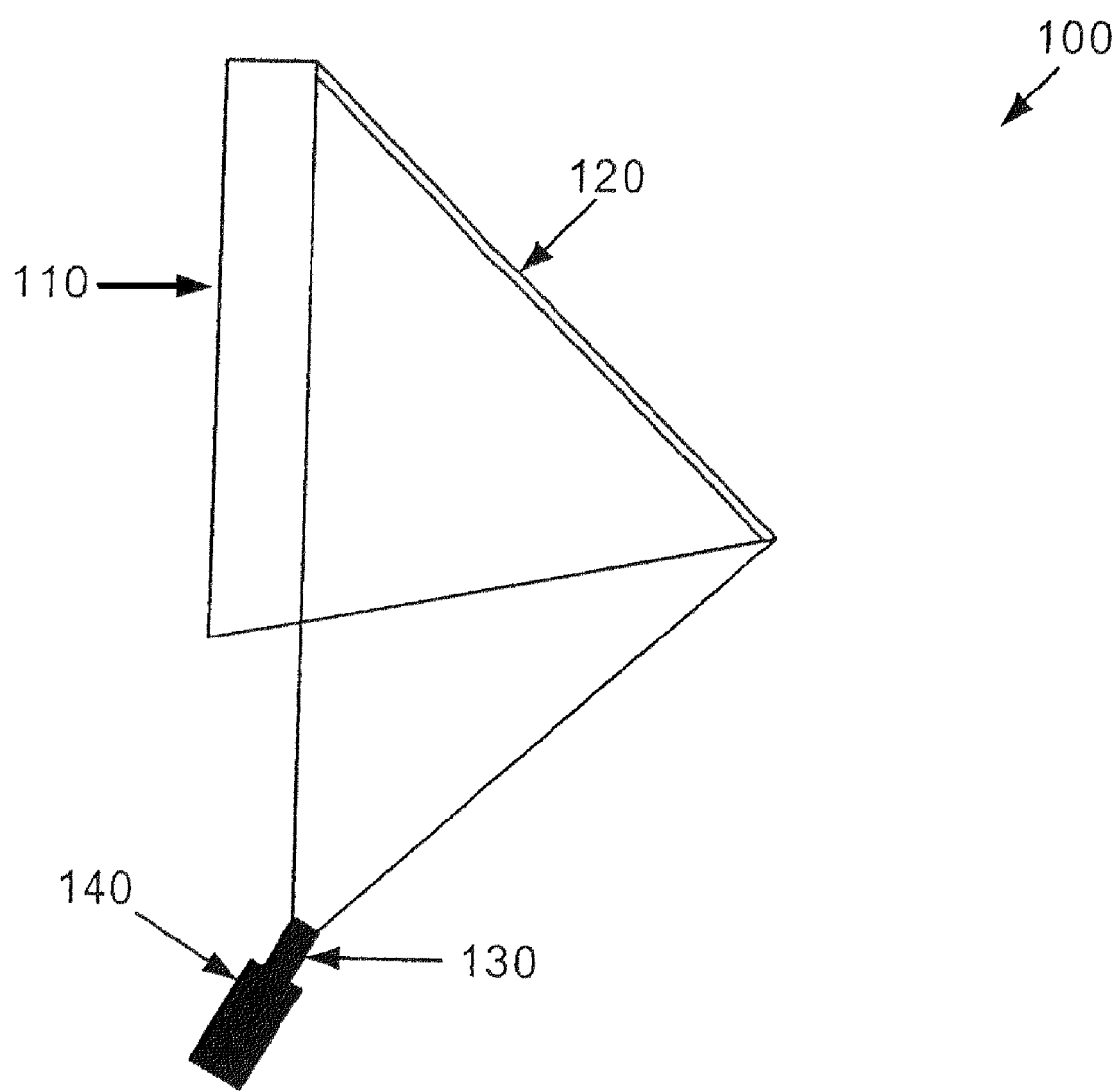
FIG. 1 illustrates a prior art rear projection display device.
Figure 2:
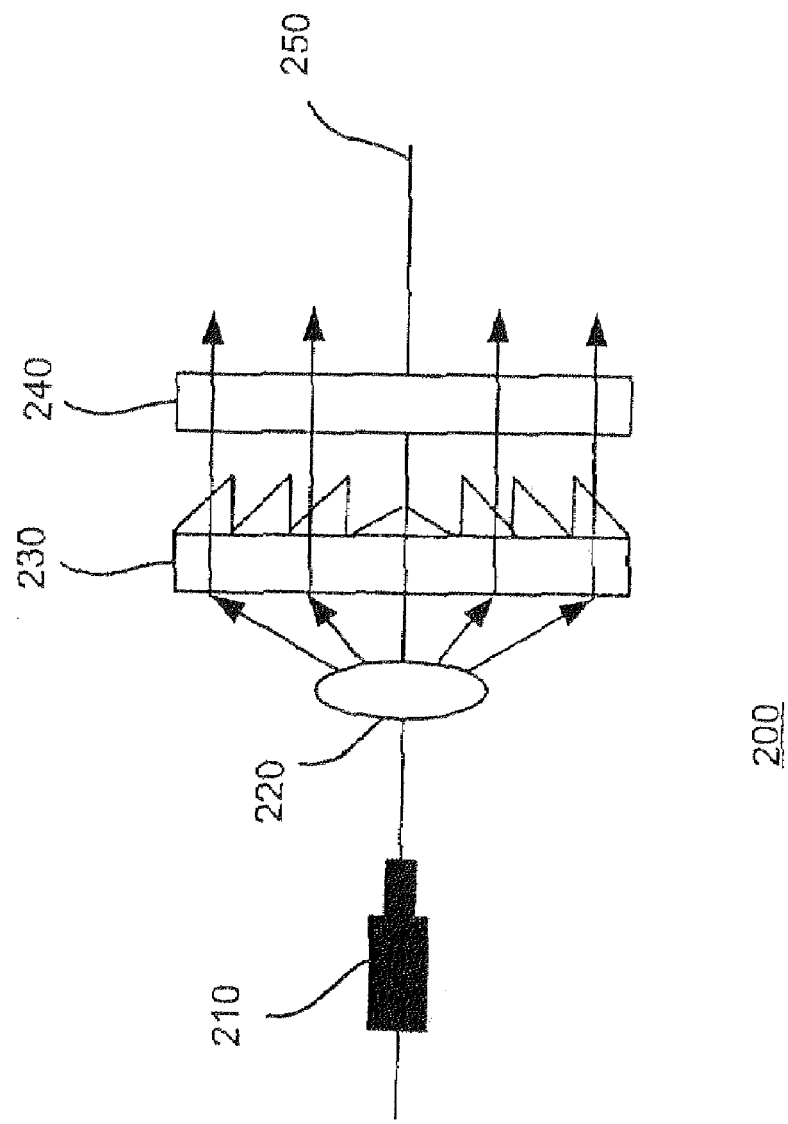
FIG. 2 illustrates a conventional rear projection display device 200 that is implemented with a Fresnel lens.
Figure 3:
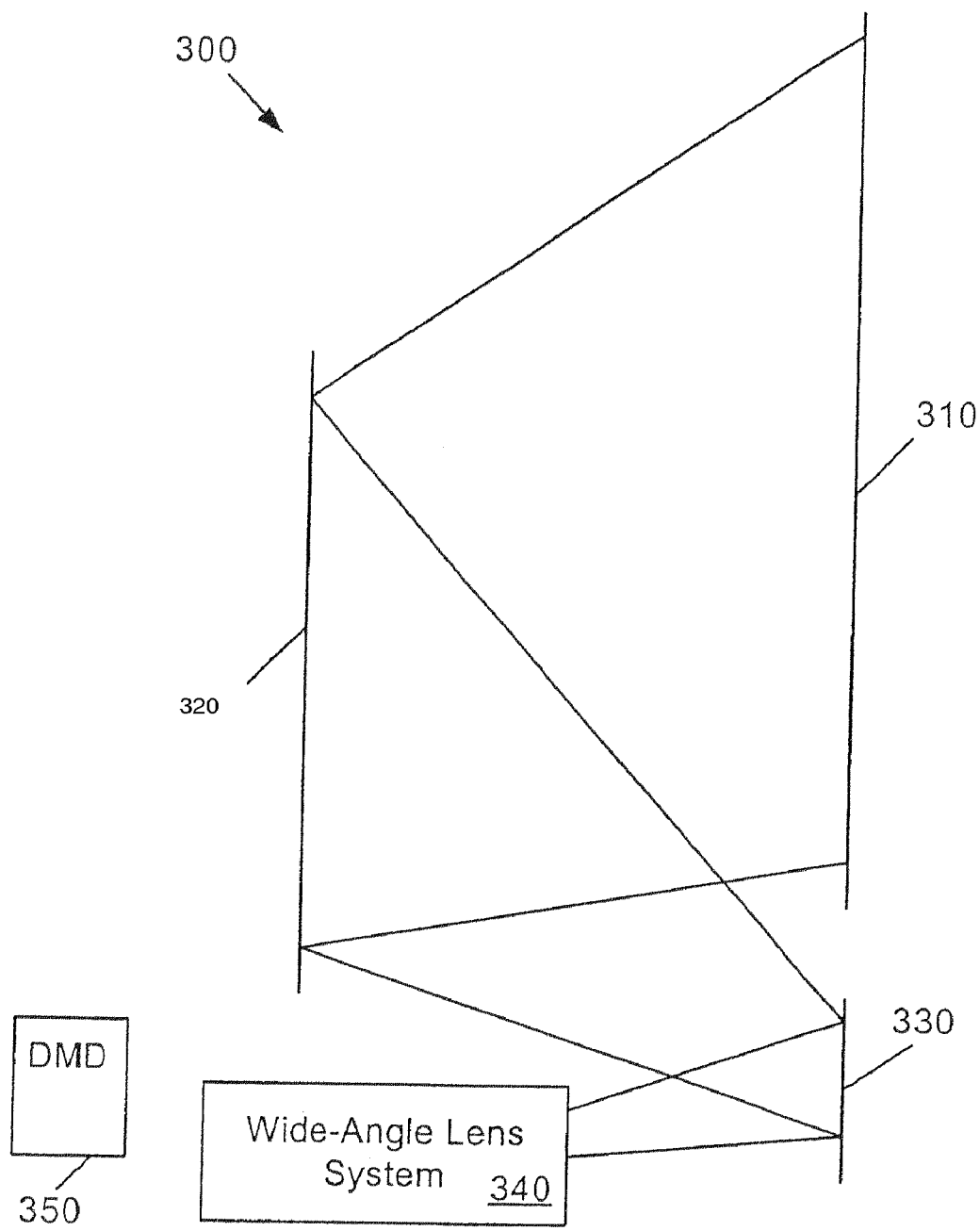
FIG. 3 illustrates one embodiment of an ultra-thin rear projection display device with planar mirrors parallel to a screen.

FIG. 3 illustrates one embodiment of an ultra-thin rear projection display device with planar mirrors parallel to a screen. As described in greater detail below, use of planar mirrors parallel to the screen, as well as, a wide angle projection lens having an optic axis that is perpendicular to the mirrors and the screen allows the ultra-thin rear projection display device to be thinner and simpler than prior art rear projection display devices. For example, an ultra-thin rear projection display device, as described herein, which is less than 7 inches thick may produce a 60-inch image.

In one embodiment, ultra-thin rear projection display device 300 includes screen 310, back plate mirror 320, intermediate mirror 330, lens system 340 and digital micromirror device (DMD) 350. Other components, for example, image generating components are not illustrated for reasons of simplicity of description. An image can be provided to DMD 350 in any manner known in the art. DMD 350 selectively reflects light from a light source (not shown in FIG. 3) to lens system 340. Other types of devices (e.g., microelectromechanical systems (MEMS), grating light valve (GLV), liquid crystal display (LCD), liquid crystal on silicon (LCOS)) can be used to provide an image to lens system 340. In one embodiment, the mirrors may be substantially parallel to the screen, which implies an alignment error of +/−10°. In one embodiment, the optic axis of the wide-angle lens system may be substantially perpendicular to the screen, which also implies an alignment error of +/−10°.

In one embodiment, DMD 350 is offset from the optic axis of lens system 340 such that only a portion (e.g., 50%, 60%, 40%) of the available lens field is used. The image from DMD 350 may be projected by lens system 340 in the upper portion of the lens field to intermediate mirror 330, in an embodiment of the invention. The image may then be reflected to back plate mirror 320 and finally to screen 310.

In an alternative embodiment of the invention, the image from DMD 350 is projected by lens system 340 in the lower portion of the lens field to intermediate mirror 330. In such an embodiment, wide-angle lens system 340 may be, at least partly, above intermediate mirror 330. Intermediate mirror 330, in turn, may be, at least partly above back plate mirror 320. The image is then reflected to back plate mirror 320 and finally to screen 310.

In order to project an image as described, lens system 340 may be a very wide-angle lens system. In one embodiment, lens system 340 has a field angle of 152° or more; however, other lenses may be used. In general, the wider the angle of lens system 340, the thinner display device 300 can be made. Description of a suitable wide-angle lens system is described in U.S. patent application Ser. No. 10/222,050 entitled Wide Angle Lens System Having a Distorted Intermediate Image, filed Aug. 16, 2002, which is hereby incorporated by reference.

Intermediate mirror 330 reflects the image to back plate mirror 320, which reflects the image to screen 310. In one embodiment, screen 310 is a Fresnel lens. Back plate mirror 320 is also a planar mirror and is parallel to screen 310 and perpendicular to the optic axis of lens system 340. Because the optic axis of lens system 340 is perpendicular to intermediate mirror 330 and both intermediate mirror 330 and back plate mirror 320 are planar and parallel to screen 310, the distortion caused by angled lenses and aspherical mirrors is absent in display device 300. This simplifies the design of display device 300 and reduces the cost and complexity of manufacturing.

Figure 4:
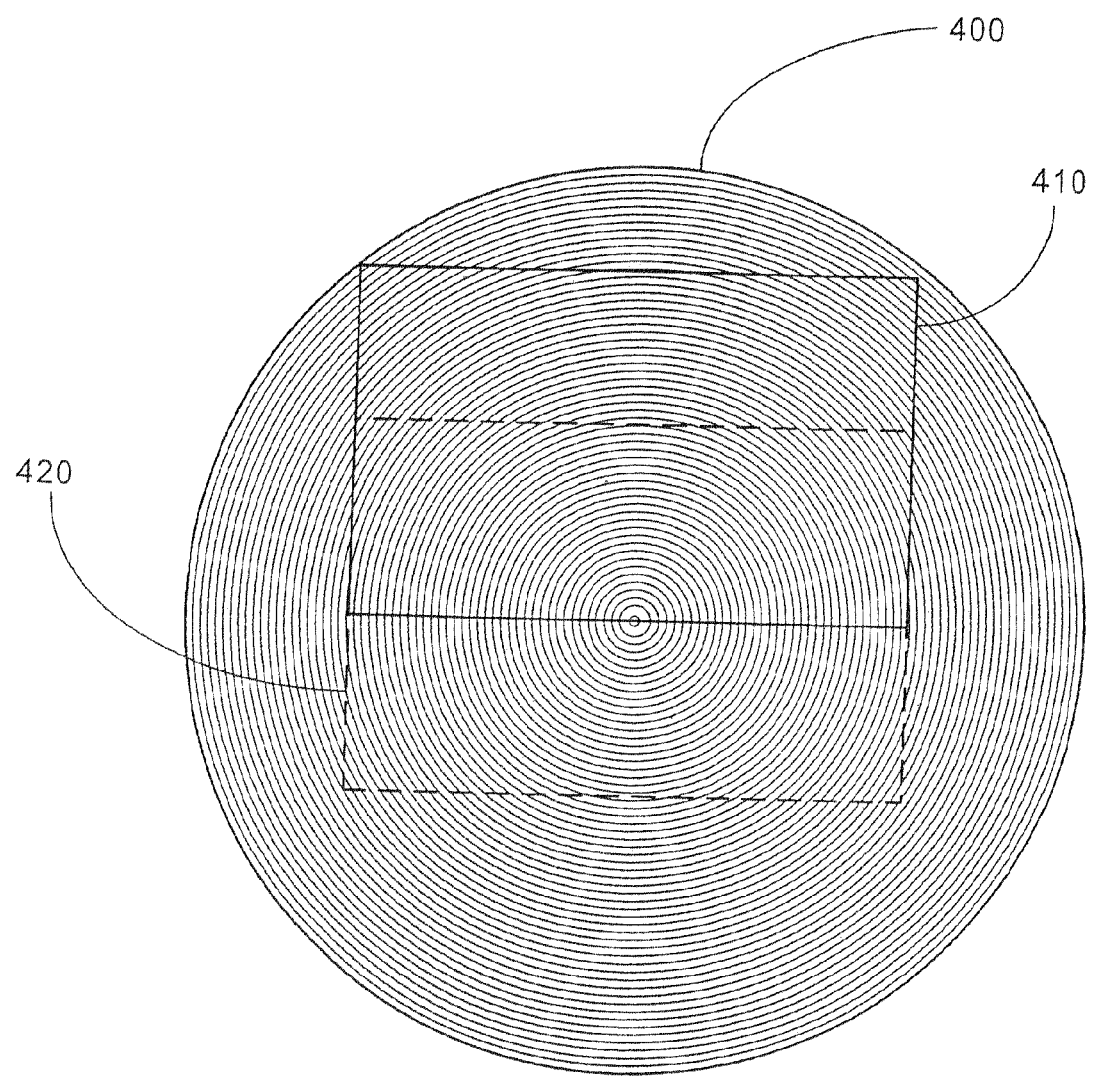
FIG. 4 illustrates a Fresnel lens with outlines of sections to be used for rear projection screens.

FIG. 4 illustrates a Fresnel lens with outlines of sections to be used for rear projection screens. FIG. 4 provides a conceptual illustration of the sections of a Fresnel lens that can be used for various rear projection display devices. The Fresnel lens can be described with two angles. The face angle is defined as the angle of the surface of each individual groove through which light passes as it enters, or in the case of some refractive designs exits the Fresnel lens relative to the optic axis of the lens. The groove angle is the angle formed between the input face and the reflection face, or in the case of a refractive lens between the optical face of the groove and the non-optical face. Face angles and groove angles are more fully discussed below with reference to FIG. 16.

In one embodiment, Fresnel lens 400 can have many concentric grooves having one or more predetermined groove angles. Techniques for manufacturing and using Fresnel lenses having a single groove angle are known in the art. In a rear projection display device in which the full lens field of the projection lens system is used, a center portion 420 of Fresnel lens 400 is used for the lens of the display device.

Dashed rectangle 420 provides an indication of a screen from the center portion of Fresnel lens 400. The size and shape of the portion of the lens to be used corresponds to the size and shape of the screen of the display device. For example, in some rear projection displays, the center of section 420 may be used for a screen, which is the center of Fresnel lens 420.

When using an offset DMD (or other device) so that only a portion of the projection lens field is used, the section of Fresnel lens 400 used for a screen is correspondingly offset from the center of Fresnel lens 400. For example, if the top half of the projection lens field is used, the bottom edge of screen portion 410 passes through the center of Fresnel lens 400.

Figure 5:
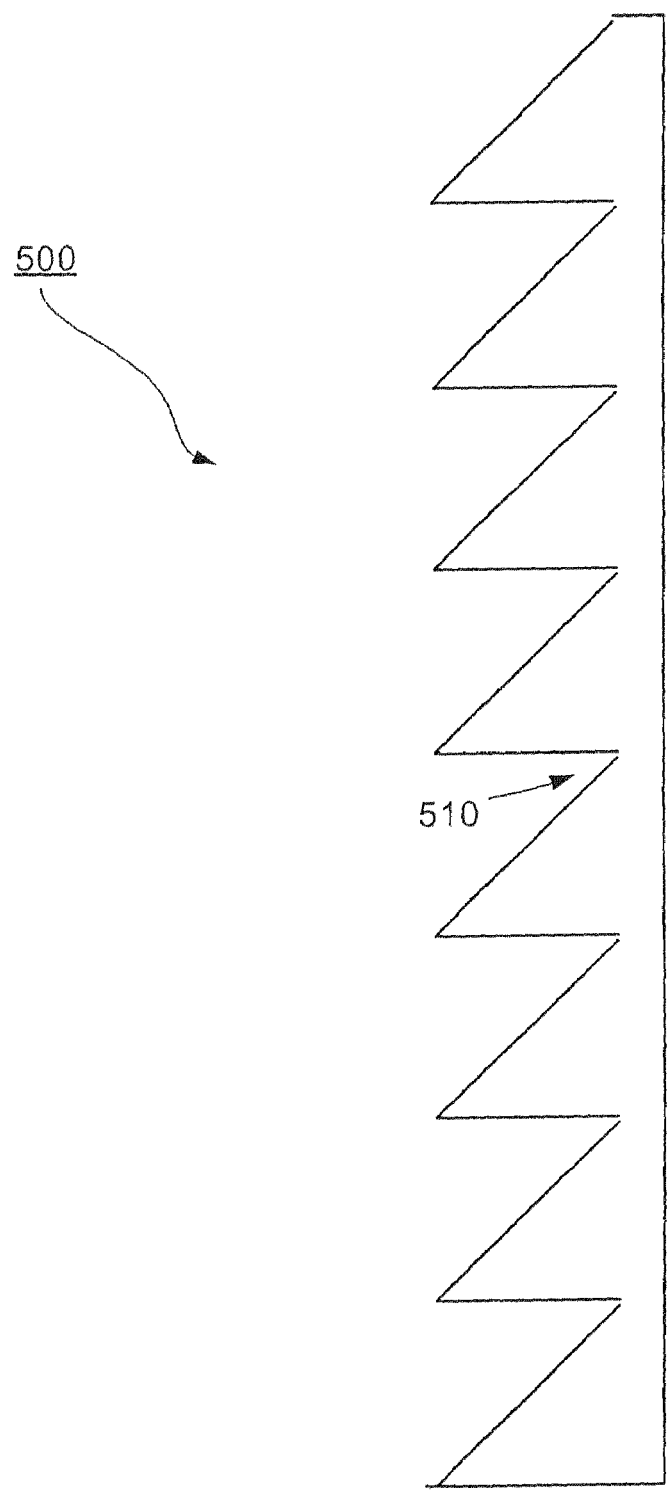
FIG. 5 illustrates a cross-sectional profile view of a Fresnel lens having a groove angle of 39°.

FIG. 5 illustrates a cross-sectional profile view of a Fresnel lens 500 having a groove angle 510 of 39°. The lens of FIG. 5 can be used with, for example, the display system of FIG. 3. When used with a display system as illustrated in FIG. 3 with an offset as described with respect to FIG. 4, the groove angle of 39° provides a balance between diamond cutter structural integrity and lens performance.

As the groove angle increases the image projected to the bottom center of lens 500 becomes dark because rays pass through the lens without being reflected from the intended total internal reflection (TIR) surface on the exterior of the groove. As the groove angle decreases, the image projected to the top corners of lens 500 become dark because reflected rays are directed down and away from the viewer. Also, as the groove angle decreases, the tool used to manufacture lens 500 can become too weak to work effectively.

Figure 6A:
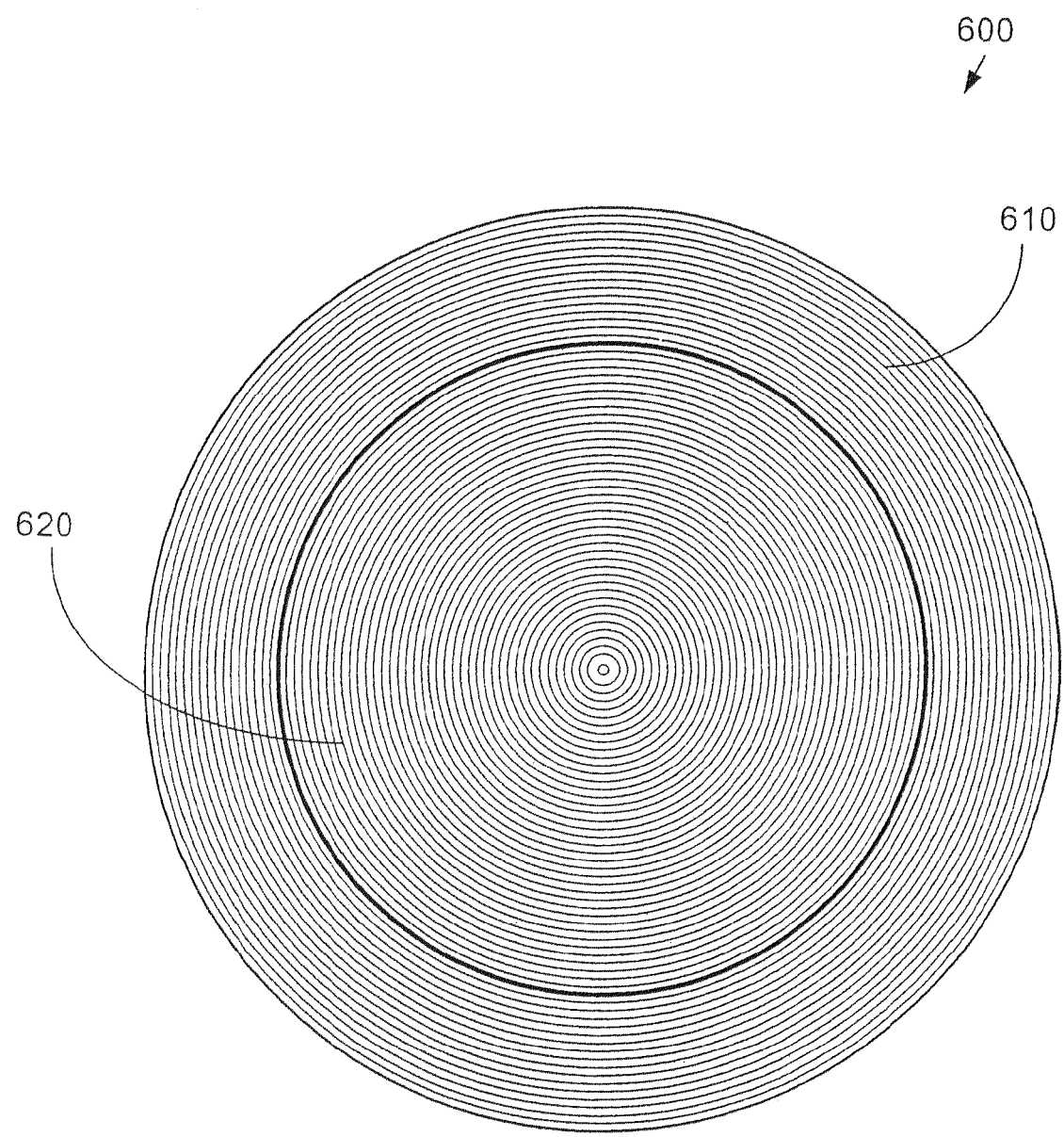
FIG. 6a illustrates a front view of a Fresnel lens having two zones each having a different groove angle.

FIG. 6a illustrates a front view of a Fresnel lens having two zones each having a different groove angle. The embodiment of FIG. 6a illustrates two zones with two groove angles; however, any number of zones with corresponding groove angles can be used. The groove angle of a lens can vary continuously. Also, while the example of FIG. 6a illustrates circular regions, other shapes can also be used.

In one embodiment, interior region 620 has grooves of approximately 35°; however, other groove angles can also be used. When used for large screens, a Fresnel lens with a single groove angle throughout provides non-uniform illumination. In one embodiment, outer region 610 has grooves of approximately 41°; however, other groove angles can also be used. In alternate embodiments, interior region 620 and outer region 610 can provide any combination of refraction and/or reflection lenses. In one embodiment, the projector side of lens 600 has grooves and the viewer side is planar. In an alternate embodiment, lens 600 has grooves on both sides.

Figure 6B:
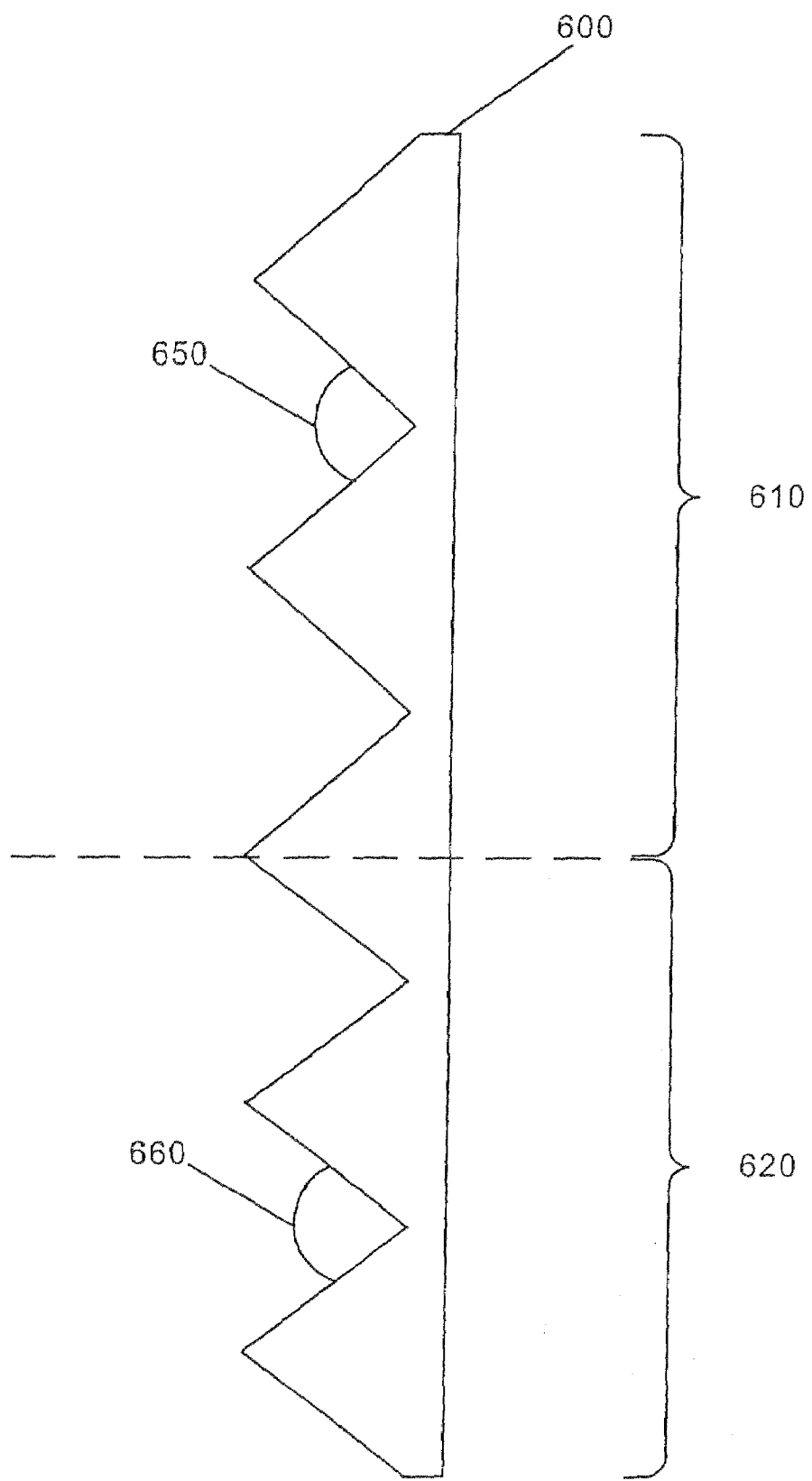
FIG. 6b illustrates a cross-sectional profile view of a two-zone Fresnel lens having a first zone with a groove angle of 35° and a second zone having a groove angle of 41°.

FIG. 6b illustrates a cross-sectional profile view of a two-zone Fresnel lens having a first zone with a groove angle of 35° and a second zone having a groove angle of 41°. The lens of FIG. 6b can be used with, for example, the display system of FIG. 3. The lens of FIG. 6b may provide improved uniformity as compared to the lens of FIG. 5.

In one embodiment, the grooves of zone 620 provide a refractive lens and the grooves of zone 610 provide a total internal reflection (TIR) lens. The refractive and reflective zones of lens 600 can be on the same side of the lens (e.g., the projector side) or the refractive and reflective zones of lens 600 can be on opposite sides (e.g., reflective on the projector side and refractive on the viewer side). An example of an embodiment of the invention wherein the refractive and reflective zones of a lens are on opposite sides is described below with reference to FIG. 10. As described in greater detail below, transition regions can be used to reduce or even eliminate image artifacts caused by transitions between zones. For a double-sided lens, two single-sided lenses can be aligned and the planar sides of each lens can be bonded together. Alternatively, one side of the lens may be manufactured, for example, by a curing process and additional grooves can be formed directly on the opposite side of the lens by the same process.

Figure 7:
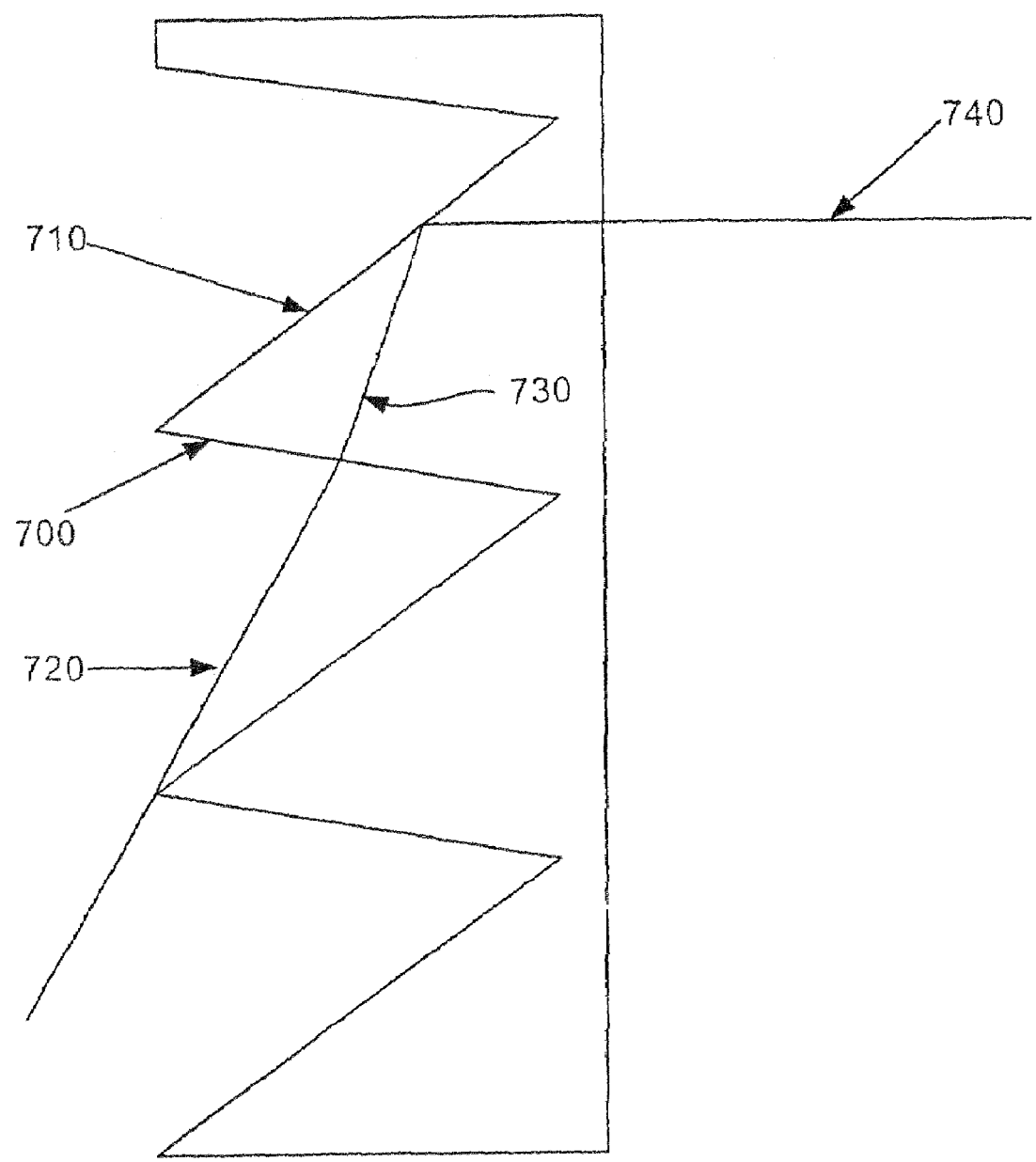
FIG. 7 illustrates an input ray having a 60° input angle with a Fresnel lens having a face angle of 10°.

FIG. 7 illustrates an input ray having a 60° input angle with a Fresnel lens having a face angle of 10°. For steep angles of input light (e.g., greater than about 45°) it is possible to design face angles of the grooves such that all light enters the Fresnel lens and reflects off of reflection face and travels directly toward the viewer. For example, input light 720 passes through groove face 700 and is slightly refracted. Refracted light 730 is reflected by reflection face 710 toward a viewer (not shown in FIG. 7). For most applications, reflected light 740 is directed toward the viewer.

As the angle of the input light decreases, there is an angle at which the refracted light misses reflection face 710. This occurs, for example, at the bottom center of the screen at the grooves closest to the Fresnel center. This light is lost and travels through the Fresnel structure creating either a ghost image or a reduction in contrast. The lost light reduces contrast at the bottom center of the screen area (and possibly everywhere depending on where the mirrors are with respect to the screen).

One technique to reduce ghost rays and improve contrast in these areas is to change the reflection face angle such that, instead of directing light toward the viewer, the lens is designed to collect as much light as possible. As a consequence, the reflected light ray 740 travels downward. This improves the contrast of the displayed image, but the downward light does not get redirected to viewer as well and appears dark.

The face angles can be designed so that light from the top corners of the screen, where the input rays are steep, is reflected slightly toward the center of the lens to improve perceived brightness at the corners of the image. An example of an embodiment of the invention in which light from the top corners of the screen is reflected toward the center of the lens is more fully described below with reference to Table 1, Equation 2, Table 2, and FIG. 17.

Figure 8:
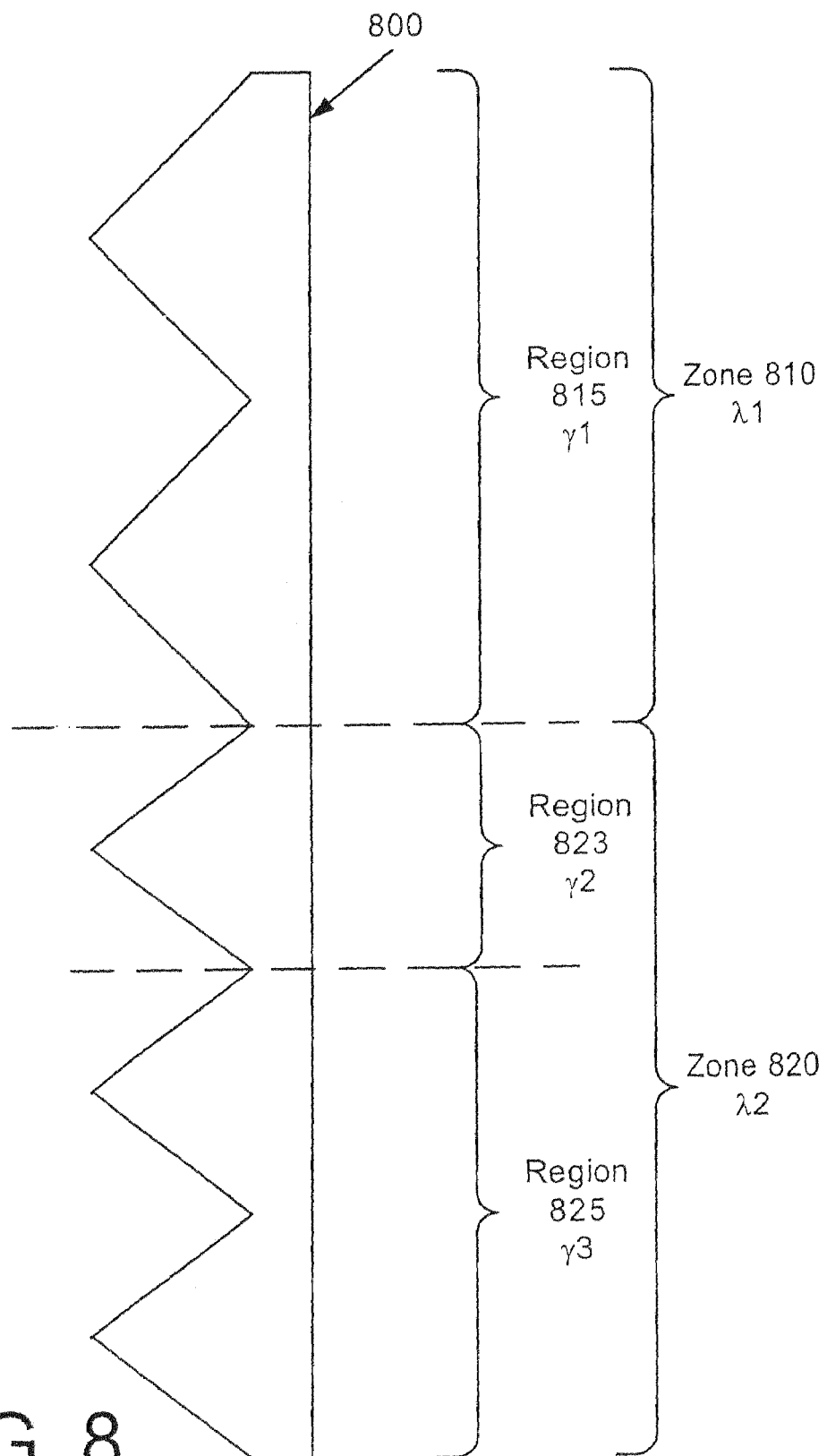
FIG. 8 illustrates a profile cross-section view of a Fresnel lens design having two zones with different groove angles and transition regions for the zones.

FIG. 8 illustrates a profile cross-sectional view of a Fresnel lens design having two zones with different groove angles and a transition region between the zones. Lens 800 is illustrated with only a small number of grooves, zones and regions. This is for simplicity of description. A Fresnel lens may be used that has any number of grooves, zones, and/or regions.

As used herein, a "zone" is an area of a Fresnel lens having a particular groove angle (when the groove angle is not continuously variable). A "region" is an area of a Fresnel lens in which the face angle ($\gamma$) is defined by a single equation. A zone may include multiple regions. In one embodiment, one or more transition regions are included at zone boundaries in order to provide a smooth zone transition.

In one embodiment, the equation, F, that defines the face angle, which can be a function of radius, r, for a first region and the equation, G, that defines the face angle for a second region, are equal at the region boundary. In other words, $F(r_1)=G(r_1)$ where $r_1$ is the region boundary. Further, the first derivative of the equation that defines the face angle for a region is equal to the first derivative of equation that defines the face angle at the region boundary. In other words, $F'(r_1)=G'(r_1)$ where $r_1$ is the region boundary. This requirement provides for a transition that is not seen because the change in face angle is smoothly continuous.

Figure 9:
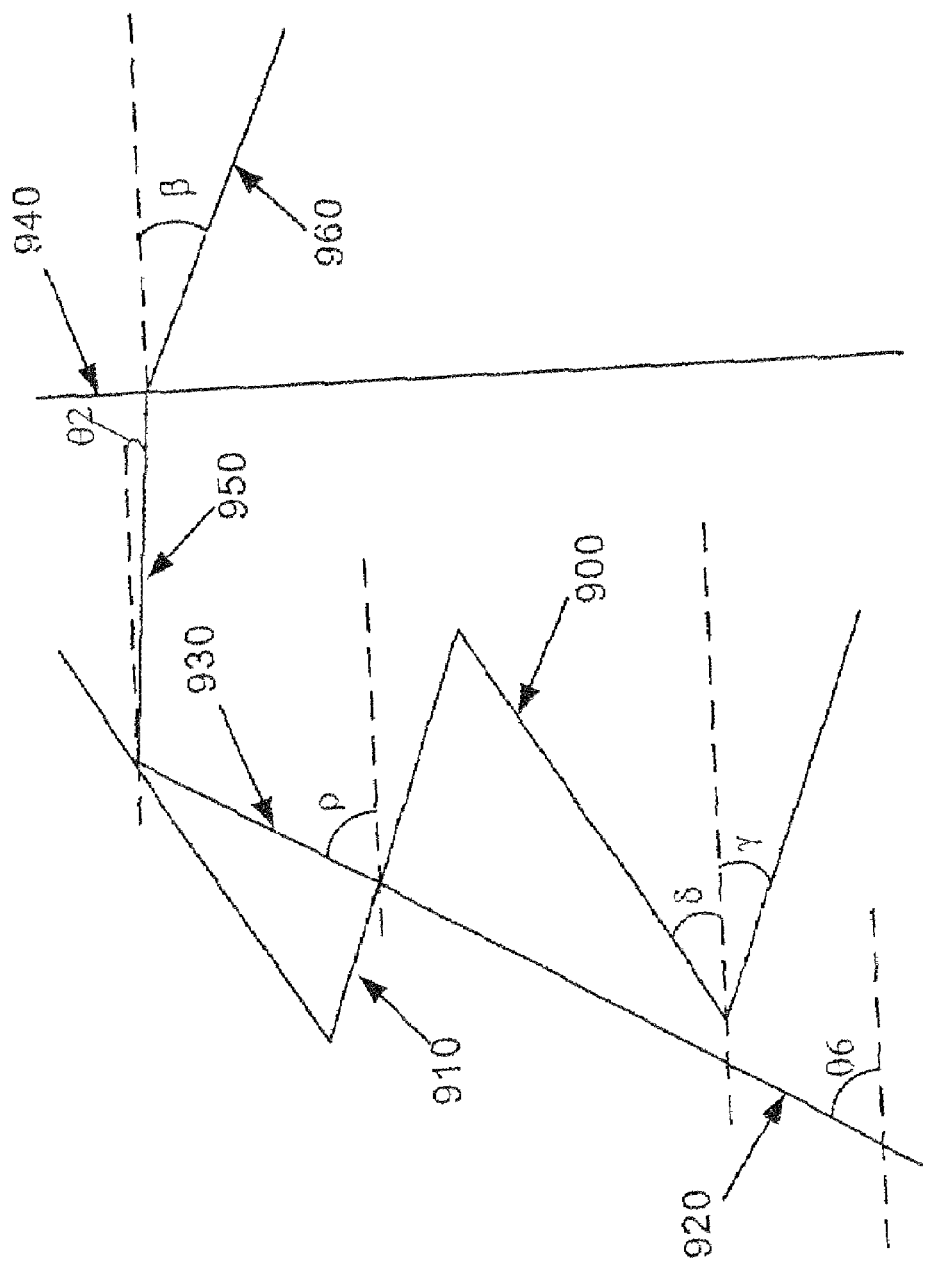
FIG. 9 illustrates a profile cross-section view of a selected portion of a Fresnel lens design.

FIG. 9 illustrates a profile cross-sectional view of a Fresnel lens design. In one embodiment, the following equations describe the various angles of the Fresnel lens design. Alternative angle relationships also may be used. In the equations that follow, $\theta 6$ is the input angle, or the angle of input ray 920 from horizontal; $\gamma$ is the face angle, or the angle of refraction face 910 from horizontal; $\delta$ is the reflection face angle, or the angle of reflection face 900 from horizontal; $\rho$ is the refracted ray angle, or the angle of refracted ray 930 from horizontal; $\theta 2$ is the reflected ray angle, or the angle of reflected ray 950 from horizontal; and β is the output ray angle, or the angle of output ray 960 from horizontal.

In one embodiment, the following equations are used to determine the angles to be used for various regions. For a fixed peak angle (peak angle k=γ+δ), the face angle can be calculated to create a Fresnel lens with no ghost rays near the bottom center and the face angles are modified to increase throughput.

For a two region embodiment, the inner region can be a lossless system defined by:

$$F(R,\gamma) := \left[\frac{\tan(\gamma)\cdot(\tan(\gamma)+2\cdot\tan(k-\gamma))+\tan\left(\frac{\pi}{2}-\gamma-\operatorname{asin}\left(\frac{\cos\left(\operatorname{atan}\left(\frac{R}{fl}\right)+\gamma\right)}{n}\right)\right)\cdot\tan(k-\gamma)}{\tan\left(\frac{\pi}{2}-\gamma-\operatorname{asin}\left(\frac{\cos\left(\operatorname{atan}\left(\frac{R}{fl}\right)+\gamma\right)}{n}\right)\right)-\tan(k-\gamma)}-\frac{R}{fl}\right]$$

where n is the refractive index of the Fresnel lens material, k is the groove angle, R is the radius from the center of the Fresnel lens, and fl is the focal length of the Fresnel lens.

Outer regions are defined by:

$$F2(R,\gamma) := \frac{\pi}{2}-\gamma-\operatorname{asin}\left(\frac{\cos\left(\operatorname{atan}\left(\frac{R}{fl}\right)+\gamma\right)}{n}\right)-2(k-\gamma)-\theta 2$$

Figure 10:
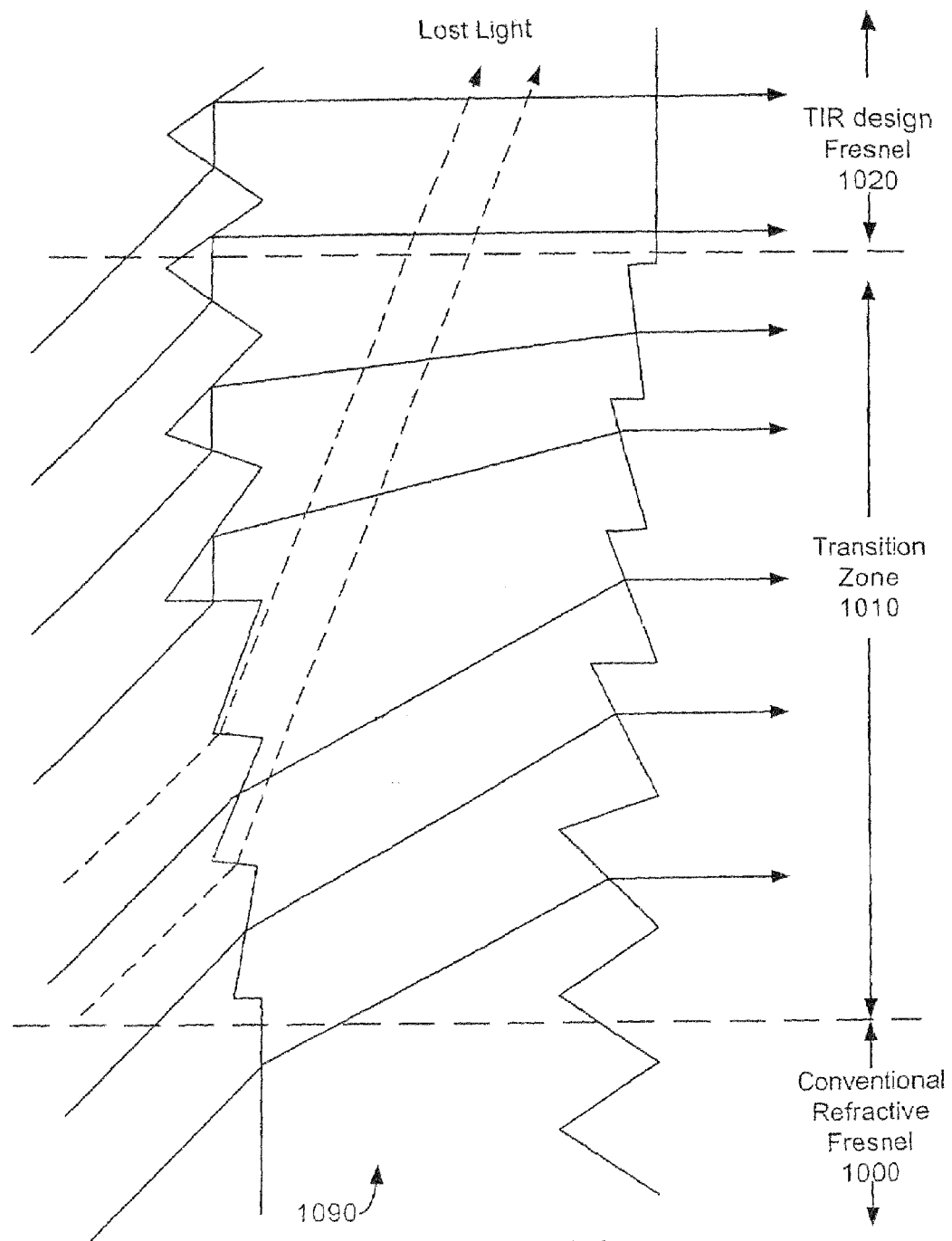
FIG. 10 illustrates one embodiment of a Fresnel lens having two zones on opposite sides of the lens with a transition region for the two zones.

FIG. 10 illustrates an embodiment of a Fresnel lens having two zones with grooves on both sides of the lens and a transition region for the two zones. Fresnel lens 1090 includes two zones: a refractive zone and a reflective zone, as well as a transition region between the two zones. In alternate embodiments, lens 1090 can have one or more zones on a single side.

In one embodiment, Fresnel lens 1090 includes an inner zone that is a conventional refractive Fresnel lens design 1000. The inner zone may include the center of lens 1090 extending outward until the outer zone becomes more efficient than the inner zone. Fresnel lens 1090 further includes an outer zone that is a total internal reflection Fresnel design 1020. The outer zone directs more light toward the viewer than if the refractive design of the inner zone were to extend to the edge of the lens.

In order to reduce, or even eliminate, discontinuities between the refractive and the reflective portions of lens 1090, transition region 1010 is included. In one embodiment, in transition region 1010, the light rays internal to Fresnel lens 1090 change gradually from the upward angle of the refractive design to the horizontal angle of the reflective design. The gradual change reduces image discontinuities due to overlapping rays.

Figure 11:
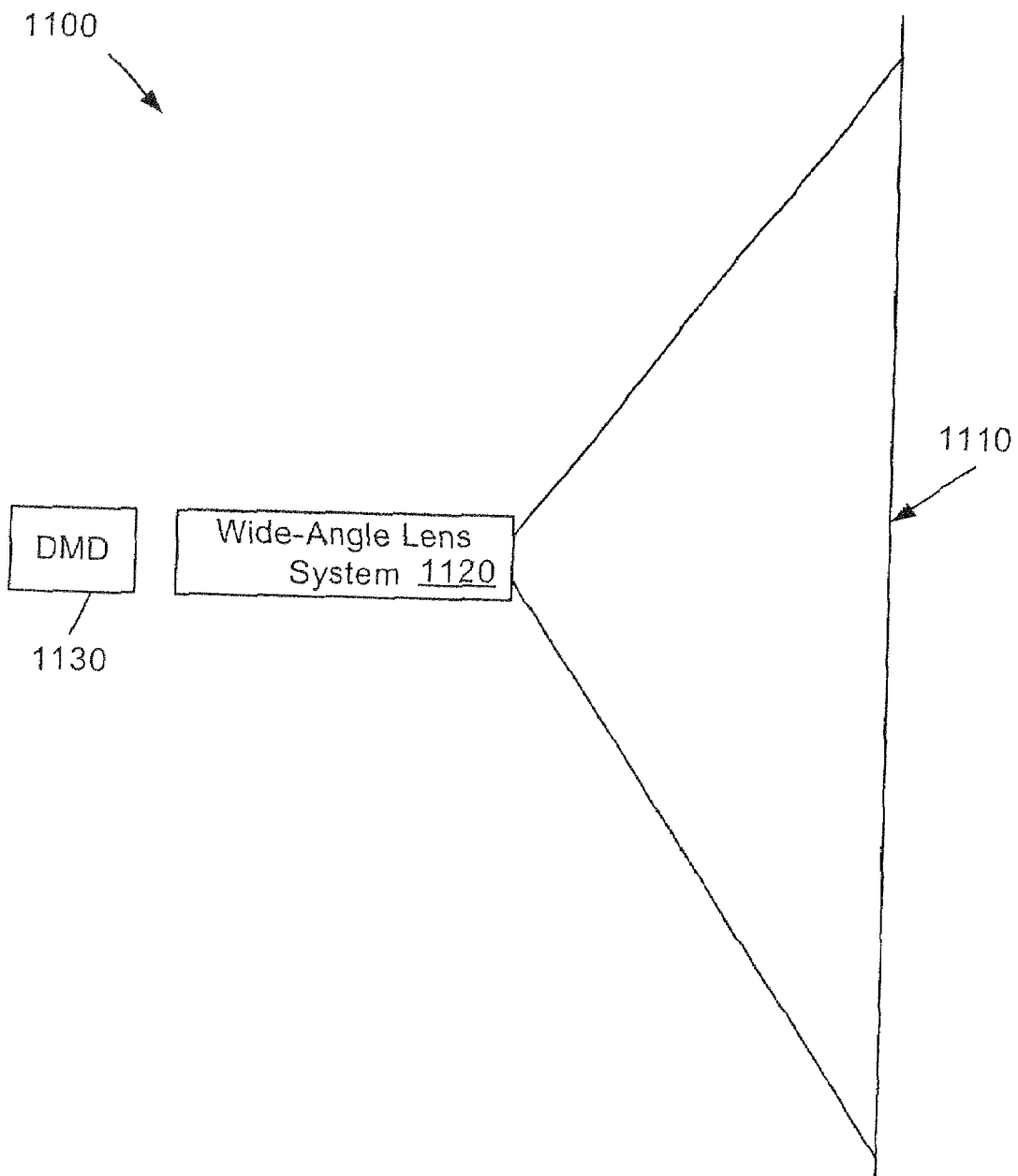
FIG. 11 illustrates one embodiment of a rear projection display device having a wide-angle lens.

FIG. 11 illustrates one embodiment of a rear projection display device having a wide-angle lens. Display device 1100 includes screen 1110, wide-angle lens system 1120 and DMD 1130. In one embodiment, screen 1110 is a Fresnel lens as described in greater detail above.

An image may be generated by optical engine components (not shown in FIG. 11) that are known in the art and directed to wide-angle lens system 1120 via DMD 1130. In some embodiments, DMD 1130 may be replaced by other components, for example, microelectromechanical systems (MEMS), grating light valves (GLV), liquid crystal display (LCD), liquid crystal on silicon (LCOS), etc. In one embodiment, the optic axis of DMD 1130 is aligned with the optic axis of wide-angle lens system 1120 so that the full lens field is used to project the image to screen 1110. In alternate embodiments, the optic axis of DMD 130 can be offset from the optic axis of wide-angle lens system 1120. Use of a Fresnel lens, as described above, may provide a thinner system with better brightness uniformity.

Diffusing Stray Light

Figure 12:
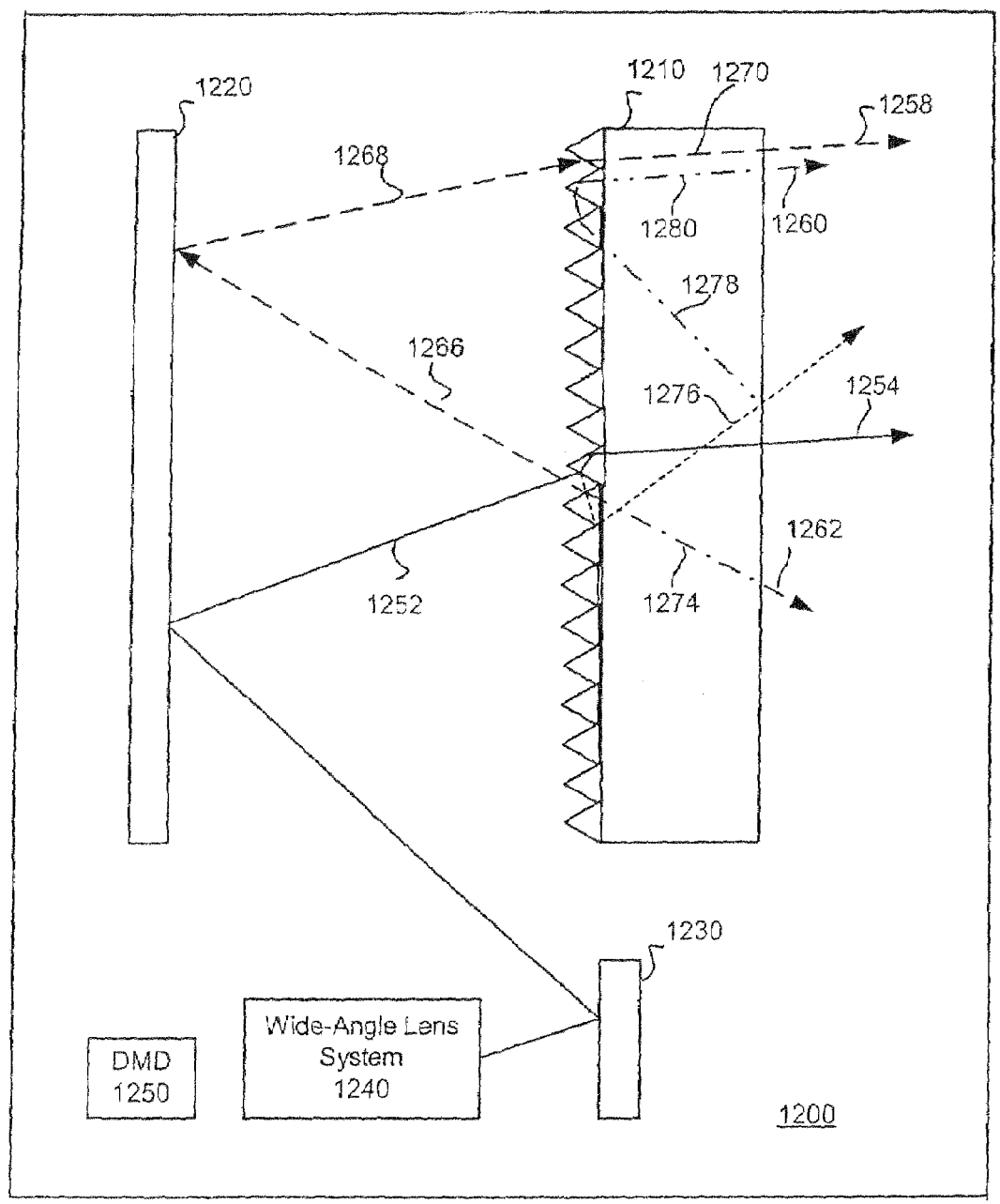
FIG. 12 illustrates rear projection display device 1200 and the potential problem of stray light.

FIG. 12 illustrates rear projection display device 1200 and the potential problem of stray light. Rear projection display device 1200 includes screen 1210, back plate mirror 1220, intermediate mirror 1230, wide-angle lens system 1240, and digital micromirror device (DMD) 1250. DMD 1250 and wide-angle lens system 1240 project an image onto intermediate mirror 1230. Intermediate mirror 1230 reflects the projected image to back plate mirror 1220. Light reflected from back plate mirror 1220 may produce a desired image (e.g., ray 1254) and an undesirable image (e.g., stray rays 1258, 1260, and 1262). For example, if light travels the path defined by reference numeral 1252, it may produce desired ray 1254.

The angular surfaces of screen 1210 (e.g., the flat output surface) act as fairly good mirrors and coherently reflect some of the light that impinges on the surfaces. Light that is coherently reflected from the angular surfaces of screen 1210 may produce objectionable stray images. For example, light may travel the path defined by reference numerals 1252, 1266, 1268, and 1270 to produce stray ray 1258. Similarly, light may travel the path defined by 1252 and 1274 to produce stray ray 1262. A third example of the path "stray light" may take is shown by reference numerals 1252, 1276, 1278, and 1280 to produce stray ray 1260. A person of ordinary skill in the art appreciates that stray images may be produced by light traveling paths other than the exemplary paths shown in FIG. 12.

Figure 13:
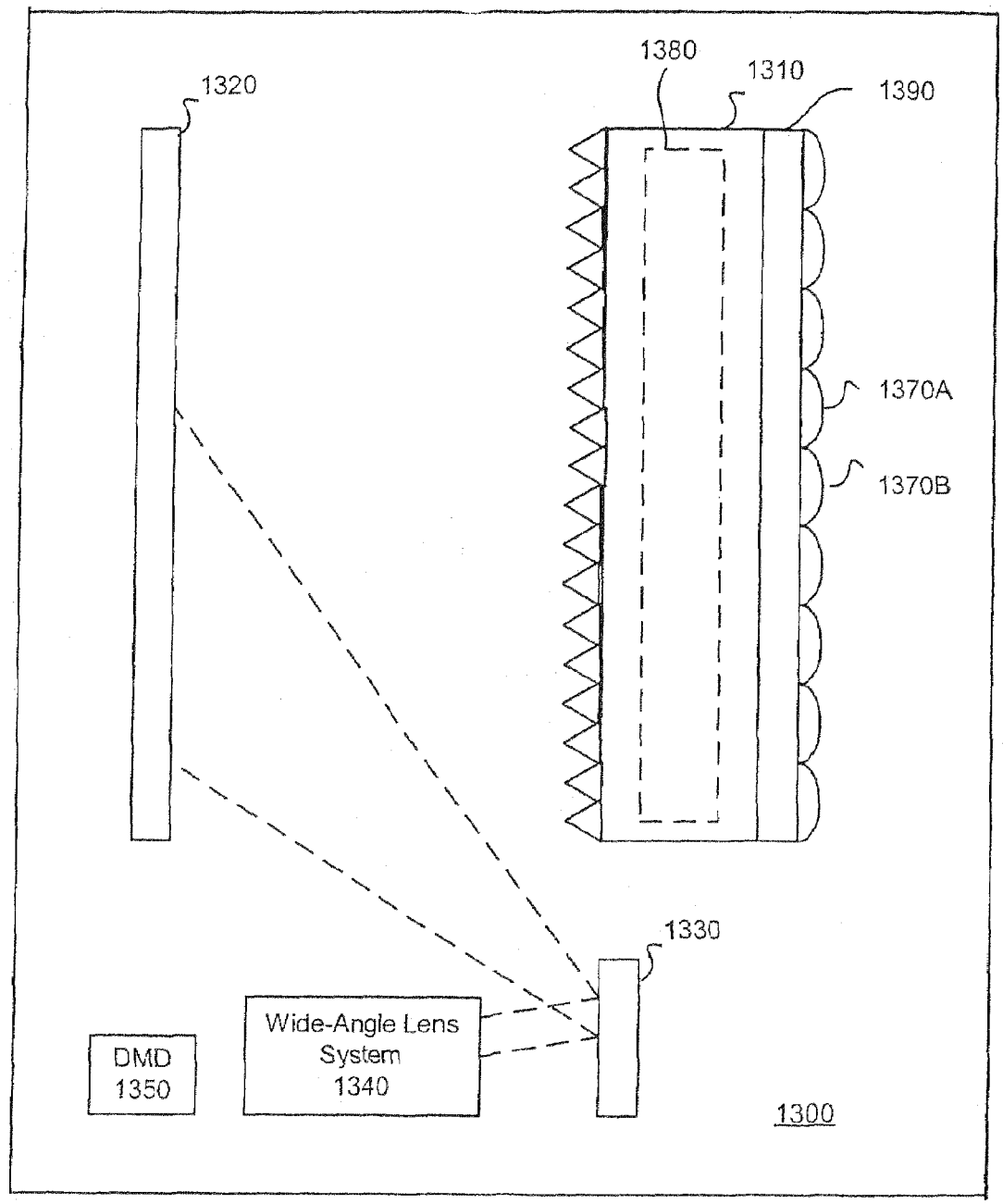
FIG. 13 illustrates rear projection display device 1300, with elements to reduce stray images.

FIG. 13 illustrates rear projection display device 1300, with elements to reduce stray images. Rear projection display device 1300 may include more components than those shown in FIG. 13 or a subset of the components shown in FIG. 13. It is not necessary, however, that all of these generally conventional components be shown in order to disclose stray light reduction.

In one embodiment, rear projection display device 1300 includes Fresnel lens 1310, back plate mirror 1320, intermediate mirror 1330, wide-angle lens system 1340, and digital micromirror device (DMD) 1350. Other components, for example, image generating components are not illustrated for reasons of simplicity of description. Fresnel lens also may include bumps 1370, diffuser 1380, and/or diffusion layer 1390.

Bumps 1370 help to reduce stray light visibility by scattering the stray light in many different directions. In some embodiments, bumps 1370 are affixed to the output side of Fresnel lens 1310. In alternative embodiments, bumps 1370 are formed on the surface of (e.g., are of unitary construction with) Fresnel lens 1310. In such embodiments, bumps 1370 may be formed by a curing process (e.g., an ultra violet (UV) curing process). Curing processes, including UV curing processes, are well known in the art. In yet other alternative embodiments, bumps 1370 may be formed by abrading a surface of Fresnel lens 1310 (e.g., abrading the output surface of Fresnel lens 1310).

Bumps 1370 are typically formed from translucent materials such as plastic or glass. In some embodiments, bumps 1370 are formed from the same material as Fresnel lens 1310. In alternative embodiments, bumps 1370 are formed from a different material than the material used to form Fresnel lens 1310.

In an embodiment, bumps 1370 are lenticular bumps. The term lenticular bump broadly refers to a bump having a convex cylinder shape. In alternative embodiments, bumps 1370 are two-dimensional hills that are regularly or randomly distributed across the output side of Fresnel lens 1310. In an embodiment, at least one bump 1370 (e.g., 1370A) has a different size and/or shape than another bump (e.g., 1370B).

Fresnel lens 1310 may include diffuser 1380 to reduce stray light. Diffuser 1380 is typically formed from a translucent material such as plastic or glass. In an embodiment of invention, diffuser 1380 is formed by adding beads (e.g., white and/or tinted beads) to the material from which Fresnel lens 1310 is formed, while that material is in a liquid state. In such an embodiment, diffuser 1380 is said to be "of unitary construction with" Fresnel lens 1310.

The optical qualities of diffuser 1380 may be carefully selected so that light passing through diffuser 1380 a single time is not significantly altered. In contrast, light passing through diffuser 1380 multiple times is scattered in many directions to reduce the likelihood that it will interfere with the image quality of ultra-thin rear projection display device 1300.

Diffusion layer 1390 provides an alternative (and/or complimentary) mechanism for reducing stray light in an embodiment of the invention. The characteristics of diffusion layer 1390 are similar to those of diffuser 1380. For example, diffusion layer 1390 is typically formed from a translucent material designed to scatter light that passes through it more than once. Since diffusion layer 1390 is thin and close to the image surface, stray light is diffused without significantly reducing the sharpness of a displayed image.

Diffusion layer 1390 is affixed to the output surface of Fresnel lens 1310, in an embodiment. In alternative embodiments, diffusion layer 1390 is formed in a curing process (e.g., UV curing) on a surface of Fresnel lens 1310. In an exemplary embodiment, diffusion layer 1390 is approximately 0.8 millimeters thick (+/−10 percent). In alternative embodiments, diffusion layer 1390 may be thinner or thicker than 0.8 millimeters and may have a different tolerance (e.g., +/−3%, +/−5%, +/−12%, +/−15%, etc.)

In an embodiment, Fresnel lens 1310 includes one of diffuser 1380, diffusion layer 1390, and bumps 1370. In an alternative embodiment, Fresnel lens 1310 includes a combination of diffuser 1380, diffusion layer 1390, and/or bumps 1370. Fresnel lens 1310 may include any combination of diffuser 1380, diffusion layer 1390, and/or bumps 1370.

Figure 14:
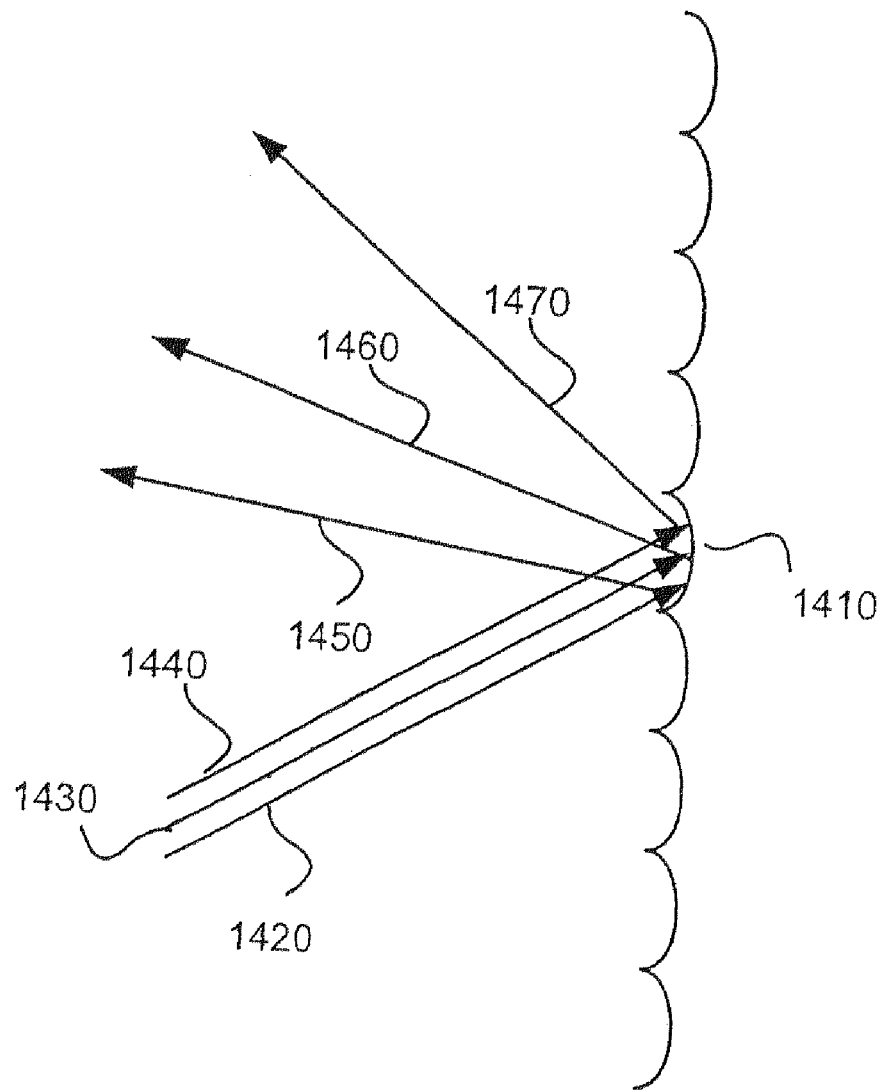
FIG. 14 illustrates an exemplary bump 1410 scattering light rather than coherently reflecting light.

FIG. 14 illustrates an exemplary bump 1410 scattering light rather than coherently reflecting light. Rays 1420, 1430, and 1440 are substantially parallel to each other and impinge on bump 1410. If rays 1420, 1430, and 1440 impinge on a flat surface they may be reflected coherently with respect to one another and are more likely, therefore, to create a stray image. Since the surface of bump 1410 is curved, however, each ray has a different angle of incidence with respect to bump 1410. Therefore, bump 1410 scatters rays 1420, 1430, and 1440. Rays 1450, 1460, and 1470 illustrate the scattering effect of bump 1410.

Figure 15:
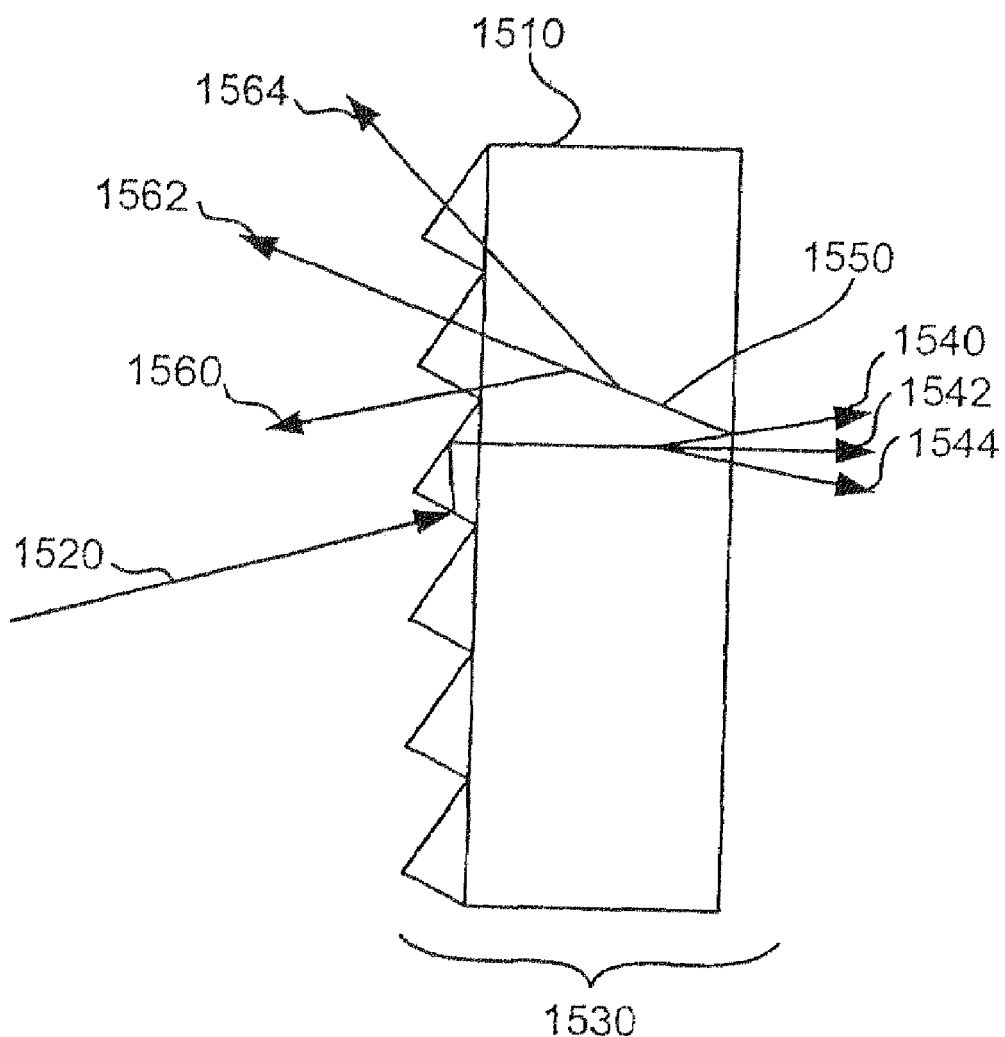
FIG. 15 illustrates an exemplary diffusion layer 1510 diffusing light that might otherwise form a stray image.

FIG. 15 illustrates an exemplary diffusion layer 1510 diffusing light that might otherwise form a stray image. Ray 1520 impinges on Fresnel lens 1530. Ray 1520 travels through diffusion layer 1510 and is diffused slightly into rays 1540, 1542, and 1544. Light from rays 1540, 1542, and 1544 may reflect off of the flat output surface of Fresnel lens 1530.

Ray 1550 is an exemplary ray reflecting off of the flat output surface of Fresnel lens 1530. Ray 1550 travels through diffusion layer 1510 and is diffused into rays 1560, 1562, and 1564. If rays 1560, 1562, and 1564 return to Fresnel lens 1530 they are widely separated and will not form a visible stray image.

Exemplary Fresnel Equation

Figure 16:
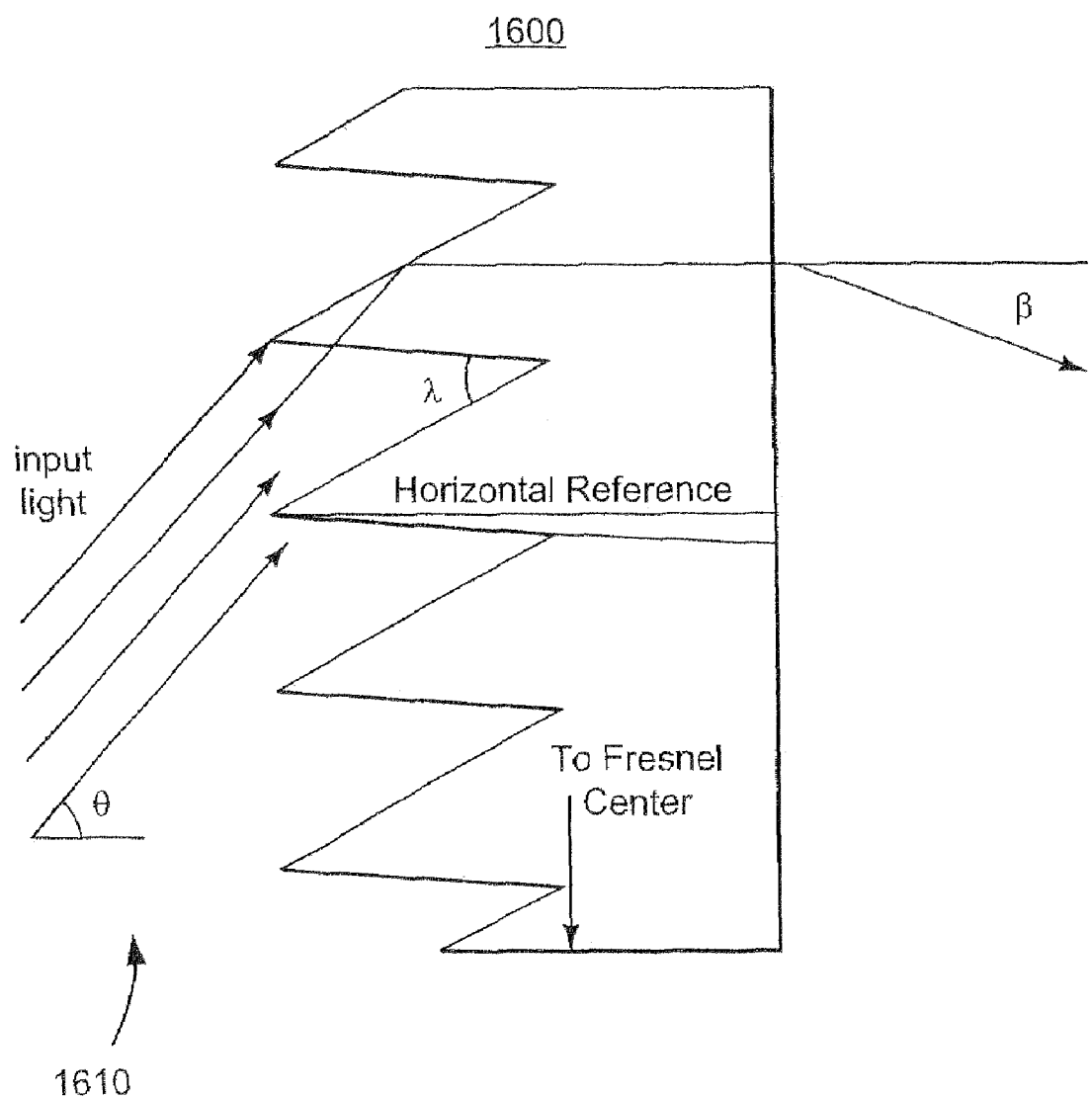
FIG. 16 illustrates the relationship between face angle ($\gamma$) and output ray angle ($\beta$), according to an embodiment of the invention.

FIG. 16 illustrates the relationship between face angle ($\gamma$) and output ray angle ($\beta$), according to an embodiment of the invention. As shown in FIG. 16, input light 1610 reaches Fresnel lens 1600 with an input ray angle theta ($\theta$). The groove angle for the illustrated zone of Fresnel lens 1600 is shown by angle lambda ($\lambda$). As previously discussed in connection with FIG. 6a through FIG. 8, Fresnel lens 1600 may have more than one zone and each zone may have a different groove angle. The various zones of Fresnel lens 1600 may be defined by distances (R) from the center of the Fresnel lens (e.g., the center of Fresnel lens 600, shown in FIG. 6a). Table 1 provides a zone equation for the illustrated embodiment of the invention. The zone equation expresses face angle ($\gamma$) in terms of the refraction angle, output ray angle ($\beta$), and groove angle ($\lambda$).

TABLE 1

| | |
|---|---|
| First zone | |
| Minimum radius | R = 245 |
| Maximum radius | R = 1230 |
| Zone equation | $\gamma = \tan^{-1}\left(\dfrac{n\sin\{\beta' + \lambda\} + \sin(\theta + \lambda)}{n\cos\{\beta' + \lambda\} - \cos(\theta + \lambda)}\right) + \lambda - \dfrac{\pi}{2}$ |
| Equation coefficients | n = 1.55 |
| | $\beta' = \sin^{-1}(\sin \beta/n)$ |
| Groove angle ($\lambda$) | 38° |

Equation 2 describes how output ray angle ($\beta$) varies with the radial distance R, in an embodiment of the invention. Equation 2 is expressed as a spline equation. Spline equations are well known to those of ordinary skill in the art.

$$\beta = \beta_1 + \sum_{k=1}^{4} \Delta_k \left[ \left\{ 1 + \left(1 + \frac{R - R_0}{R_5 - R_0} - \frac{R_k - R_0}{R_5 - R_0}\right)^m \right\}^{\frac{1}{m}} - 1 \right],$$ Equation 2 where $$\Delta_1 = \frac{\beta_2 - \beta_1}{\dfrac{R_2 - R_0}{R_5 - R_0} - \dfrac{R_1 - R_0}{R_5 - R_0}} \text{ and}$$

$$\Delta_k = \frac{\beta_{k+1} - \beta_k}{\dfrac{R_{k+1} - R_0}{R_5 - R_0} - \dfrac{R_k - R_0}{R_5 - R_0}} - \frac{\beta_k - \beta_{k-1}}{\dfrac{R_k - R_0}{R_5 - R_0} - \dfrac{R_{k-1} - R_0}{R_5 - R_0}}.$$

Table 2 provides the coefficients for equation 2 in an exemplary embodiment of the invention where m is 16 and $R_0$ is 230 millimeters.

TABLE 2

| | k | | | | |
|---|---|---|---|---|---|
| | 1 | 2 | 3 | 4 | 5 |
| R [mm] | 260 | 300 | 650 | 950 | 1232 |
| $\beta$ [°] | 0 | 0 | 0 | 5.5 | 8.5 |

Figure 17:
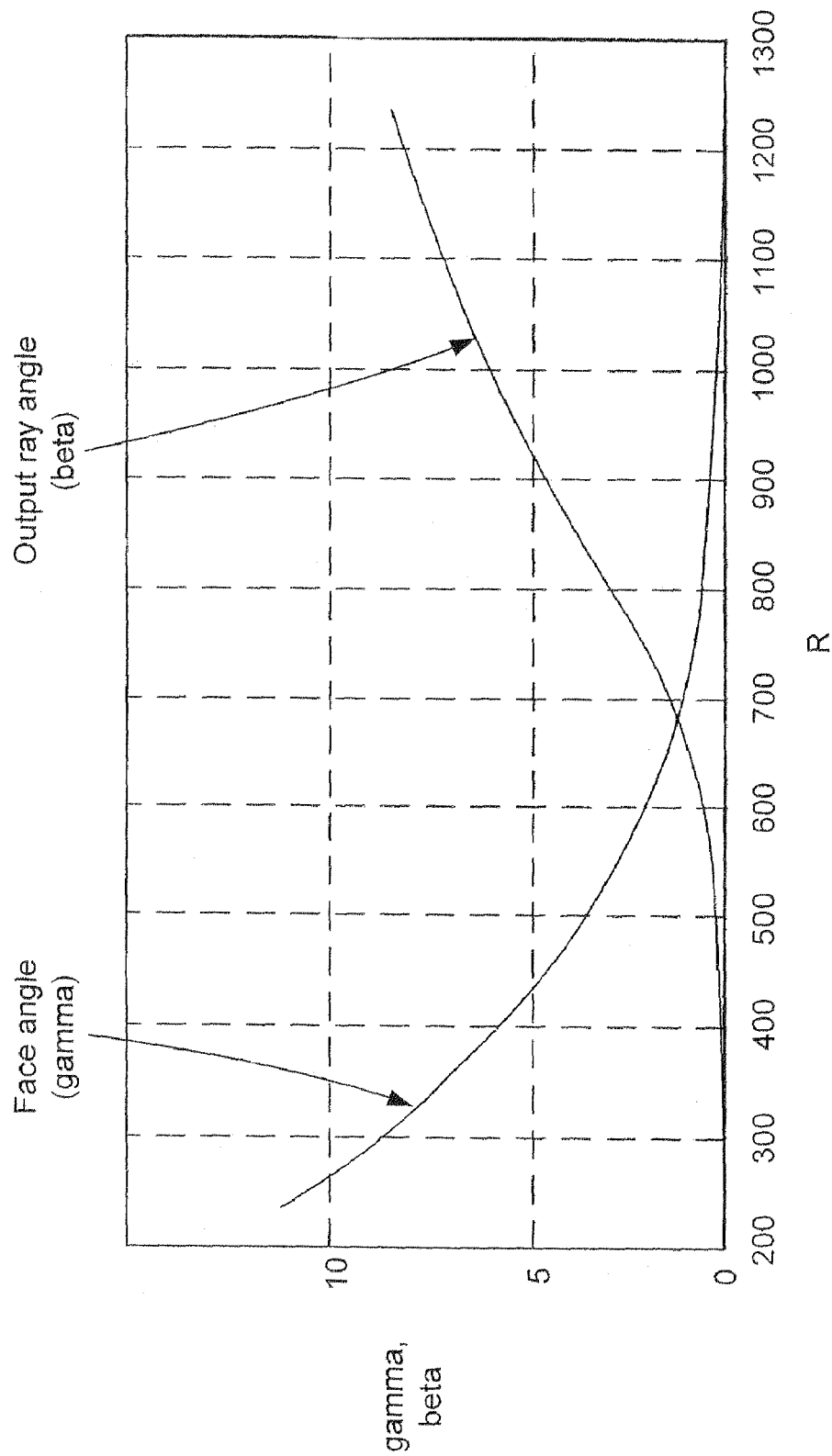
FIG. 17 provides an exemplary illustration of face angle ($\gamma$) and output ray angle ($\beta$) varying as a function of radial distance from the center of a Fresnel lens, according to an embodiment of the invention.

FIG. 17 provides an exemplary illustration of face angle (γ) and output ray angle (β) varying as a function of radial distance (R) from the center of a Fresnel lens, according to an embodiment of the invention. As illustrated in FIG. 17, face angle (γ) is nonzero in a region close to the center of the Fresnel lens and approaches zero as the radial distance from the center of the Fresnel lens increases. In contrast, output ray angle (β) is nearly zero for small values of the radial distance R and increases as the value of R increases. Thus, in the illustrated embodiment output ray angle (β) is substantially close to zero (e.g., +/−10°) for values of R corresponding to the center of the Fresnel lens and increases for values of R corresponding to the corners of the Fresnel lens. In alternative embodiments, the relationships between face angle (γ), output ray angle (β), and radial distance from the center of a Fresnel lens (R) may be different than those illustrated in FIG. 17.

Figure 18:
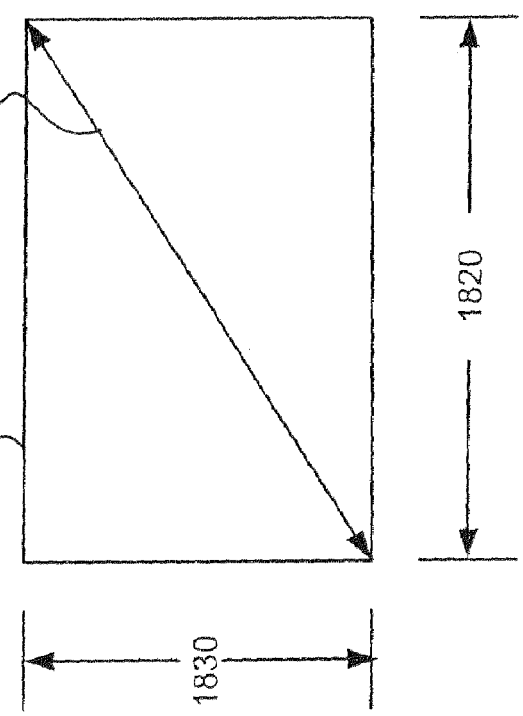
FIG. 18 is a front view of screen 1800.

The Relationship Between The Screen Diagonal Length And The Focal Distance Of The Fresnel Lens FIG. 18 is a front view of screen 1800, such as a Fresnel screen. Reference numeral 1810 illustrates the screen diagonal of screen 1800. Screen diagonal refers to the distance from one corner of screen 1800 to the opposite corner of the screen. In an embodiment, the screen diagonal may be the diagonal length of the viewable portion of screen 1800. In an alternative embodiment, the screen diagonal may be the diagonal length of the actual size of screen 1800.

Reference numerals 1820 and 1830, respectively, illustrate the width and height of screen 1800. The ratio of width 1820 to height 1830 defines the aspect ratio of screen 1800. In an embodiment, the aspect ratio of screen 1800 is 16:9. In an alternative embodiment, the aspect ratio of screen 1800 is 4:3. Screen 1800 may have an aspect ratio other than 16:9 and 4:3.

Figure 19:
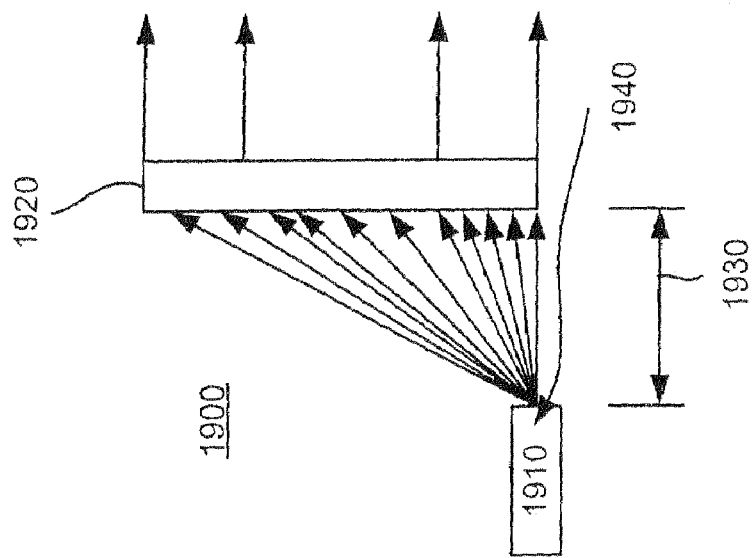
FIG. 19 illustrates rear projection display device 1900.

FIG. 19 illustrates rear projection display device 1900. Rear projection display device 1900 includes wide-angle lens system 1910 and screen 1920. In an embodiment, screen 1920 is a Fresnel lens. Focal distance 1930 represents the focal length of Fresnel lens 1920. The term focal length refers to the distance from the optical center of Fresnel lens 1920 to focal point 1940. The term focal point may refer to the spot at which impinging rays converge to a common point or focus. Aberrated rays may also form a focal point. The term "circle of least confusion" refers to a focal point formed by aberrated rays. The focal point is usually placed near the pupil of a projection lens (e.g, the pupil of the projection lens of wide-angle lens system 1910.

Focal distance 1930 may be used to express the thinness of rear projection display device 1900. For example, the thinness of rear projection display device 1900 may be expressed by the ratio of the screen diagonal of Fresnel lens 1920 to focal distance 1930. In an embodiment in which the screen diagonal is 60 inches, the ratio of the screen diagonal to focal distance 1930 is approximately 3.0. In an alternative embodiment of the invention in which the screen diagonal is 70 inches, the ratio of screen diagonal to Fresnel focal distance is approximately 4.1.

Alternative Fresnel Lens Configuration

Figure 20:
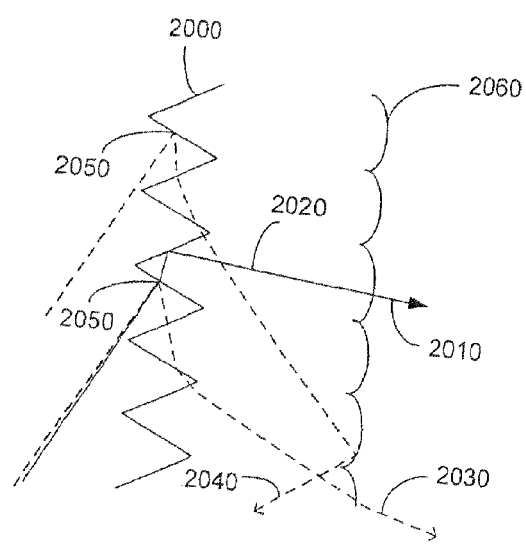
FIG. 20 illustrates stray light production from a Fresnel lens.

Various configurations of Fresnel lens, diffusion layers, bumps, etc. may be used to reduce stray light. FIG. 20, similar to FIG. 12, illustrates schematically the production of stray light that may occur as image light is directed through a Fresnel lens 2000. Specifically, in FIG. 20, image ray 2010 may be directed along light path 2020 to produce a desired image (also referred to as main image). However, undesired light, such as scattered light or stray rays 2030 may be generated during production of a desired image. The stray light may produce visible artifacts which may be undesirable when viewing an image. For example, there may be ghost images, flair and other stray light that is spaced from the desired image pixel disrupting the clarity of the pixel and the surrounding pixels.

There are many causes for such stray light. For example, stray ray 2030 may be caused by a surface reflection (shown at 2050) off of a groove face in Fresnel lens 2000. Such reflection off of the groove face may result in the image being spread out due to the extra light produced in close proximity to the desired pixel.

Other stray light may be produced. Such stray light may be generated by reflecting off of the surface of a groove (as again shown at 2050). Some stray light may have one or more additional surface reflections off of various grooves and groove surfaces. In some situations, the light may totally internally reflect (TIR) off the front surface 2060 and then have additional surface reflections off of more groove surfaces of the Fresnel lens.

Figure 21:
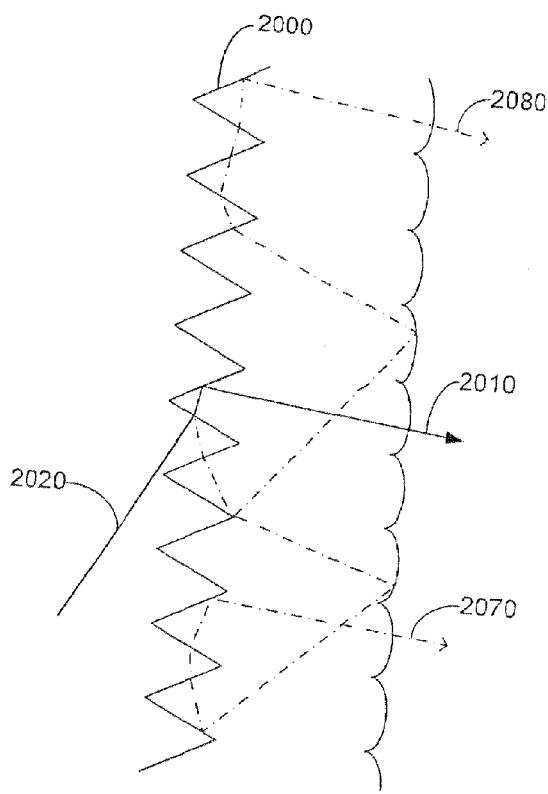
FIG. 21 further illustrates stray light production from a Fresnel lens.

FIG. 21 illustrates schematically stray light paths that may result in the production of ghost images. As with FIG. 20, image ray 2010 and its respective light path 2020 is exemplary of main image light configured to produce a desired image. Stray rays 2070 and 2080 schematically illustrate rays which may create ghost images. Ghost images may occur where light exits above or below the desired image. For example, ghost images may occur where light exits three or four pixels above or below the intended pixel. Such ghost images may produce visible artifacts, such as displaced replica of a pixel or image. As with the other stray rays, the ghost rays may be caused by internal and surface reflection along the grooves of the Fresnel lens structure.

It should be understood that the light paths shown in FIGS. 20 and 21 are for illustrative purposes only, and the light paths (both stray and main image light paths) may vary without departing from the scope of the disclosure.

Figure 22:
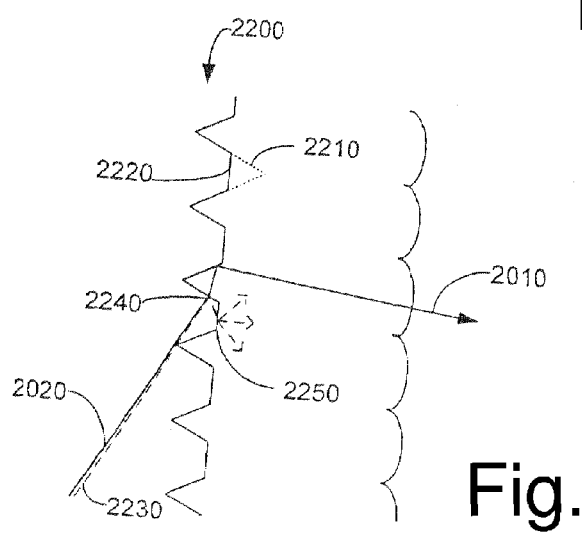
FIG. 22 illustrates a flat valley configuration for a Fresnel lens according to an embodiment of the present disclosure.

FIG. 22 illustrates a method for reducing the visibility of stray light generated by the Fresnel lens. As shown in FIG. 22, the Fresnel lens may be configured such that the majority of light that would produce stray images is scattered. For example, in FIG. 22, the Fresnel lens is modified such that the valleys of the Fresnel lens are flattened as indicated at 2200. For purposes of discussion, a valley is shown in its original configuration in dashed lines at 2210. In the new configuration, the valley includes a valley floor 2220. As used herein, a valley floor includes any flattening and/or leveling of the intersection between two grooves. The original peak and valley configuration (shown in FIGS. 20 and 21) is not considered to have a valley floor.

The flattening of the valley to produce a valley floor may operate to remove the portion of the groove surfaces that the stray rays previously reflected off of. Typically, the main image 2010 follows a light path 2020 that uses the peak of the Fresnel grooves. In contrast, the stray rays use the valley portion of the grooves, such as via surface reflection, to produce ghost images, flairs, etc. By reducing the surface from which the stray rays reflect, it is possible to reduce the amount of concentrated stray light. In other words, the stray light typically follows stray light paths which utilize the valleys. By removing the valleys of the Fresnel lens, the stray light pathways may be disrupted and the stray light rays scattered.

It should be appreciated that the use of the flat valley Fresnel lens may produce stray light along new stray light pathways. However, much of this light is scattered by the valley floor 2220. For example, stray ray 2230 has a surface reflection at 2240 off of the face of a groove. Stray ray 2230 then is directed towards the valley floor. The valley floor results in the scattering 2250 of stray light 2230. The scattering effect diminishes the visible effect of the stray ray.

In some embodiments, the Fresnel lens configuration shown in FIG. 22, may be considered to include units having a first surface configured to receive an image ray, where the image ray may be configured to impinge a tip portion of the first surface. A second surface may face the first surface and be linked to the tip portion of the first surface through a third surface, or valley floor. The third surface may be configured to scatter stray light reflected from the first surface. It should be appreciated that the flat valley may be smooth (no diffuser) and still have some effect. However, in some embodiments, the flat valley may be rough such that it scatters additional light. Thus, in some embodiments, the valley floor may be considered a scattering floor.

In some embodiments, the Fresnel lens may lie substantially within a plane with the valley floor extending substantially parallel to the plane of the Fresnel lens, such that the valley floor is flat. Although the valley floor is disclosed as being flat, it should be appreciated that in some embodiments the valley floor may include surface topography such as ridges, bumps, elevations and/or depressions. The ridges or bumps may operate to increase the scattering effect of the stray rays. Moreover, the valley floor may be inclined or sloped in some embodiments. In other embodiments, the valley floor may be blackened or otherwise textured to absorb the stray light and/or substantially disperse the stray light.

Many of the stray rays shown in FIGS. 20 and 21 may be substantially eliminated or greatly diminished by use of the flat valley configuration shown in FIG. 22. Specifically, the flat valley configuration may alter the stray light patterns and or diminish the intensity of the stray rays by scattering the light.

FIGS. 23-26 provide simplified contour plots with exemplary shading of the light pattern intensity for a selected pixel of a Fresnel screen. While it is possible to produce a contour plot illustrating relative intensities of the light pattern, for the purposes of the present description only the relative locations of the light needs to be illustrated in FIGS. 23-26.

FIG. 23 illustrates an upper pixel of a Fresnel screen having the original peak and valley configuration. The left side of FIG. 23 is an all-light plot including both the main image light and any stray light. The main image is indicated at 2310, however other light (stray light) such as 2320 may be visible. Such stray light may affect the quality of the image at the pixel.

The stray light pattern is more visible in the right side plot 2330 of FIG. 23 where the main image light has been removed. It should be noted that the intensity of some stray light (such as stray light 2320) is significant during production of the image to cause undesirable visual effect to a viewer.

FIG. 24 illustrates the same upper pixel as shown in FIG. 23 but with a flat valley Fresnel lens configuration. As with FIG. 23, the left side of FIG. 24, is an all-light plot (main image light and stray light) and the right side of FIG. 24 is a stray-light only plot. Comparing the all-light plots of FIGS. 23 and 24, a significant difference may be recognized in the amount of visible stray light localized near the image pixel. Moreover, the stray-light only plot in FIG. 24 shows that the light is scattered much more broadly (indicated at 242) and is consequently less visible to a viewer. The more scattering of the stray light, the more attenuated any effects the stray light may have on the visible image.

Figures 25, 26:
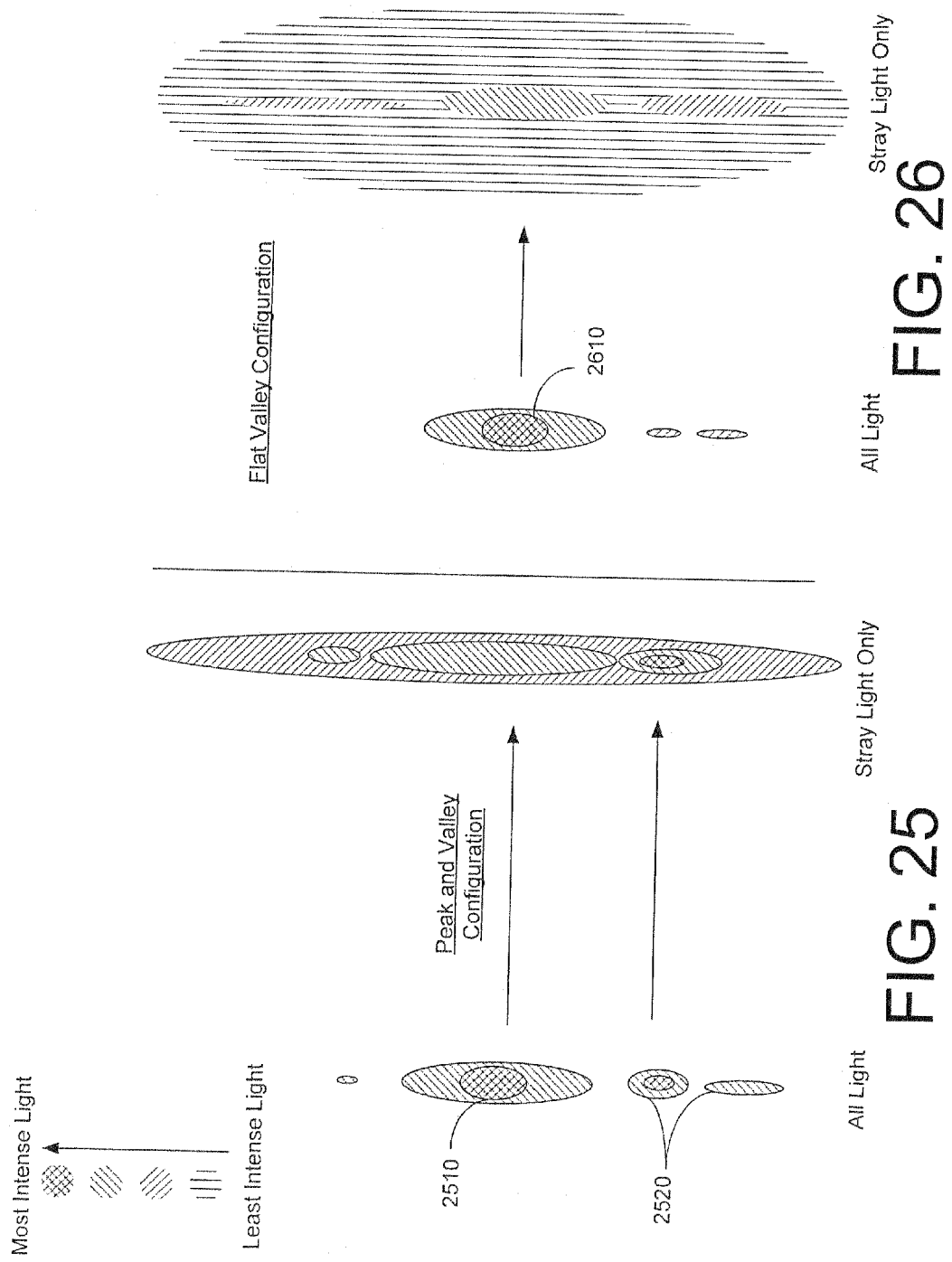
FIG. 25 a plot of light patterns for a second pixel where the light patterns are produced using a Fresnel lens of a first configuration.
FIG. 26 is a plot of light patterns for a second pixel where the light patterns are produced using a Fresnel lens of a second configuration.

FIGS. 25 and 26 further illustrate the effect of the flat valley configuration over the original peak and valley configuration. Specifically, FIGS. 25 and 26 illustrate a pixel localized in the middle of the screen. As shown in FIG. 25, the main image 2510 may be flanked by other intense light spots, such as ghost images 2520.

FIG. 26 illustrates the diminishing effect of the flat valley configuration on the ghost image. Specifically, the all-light plot shows a substantial amount of light localized at the desired image spot. The ghost light has been reduced significantly. Specifically, the ghost image shown in FIG. 25 was approximately 1.0% of the peak intensity of the pixel. The ghost image in FIG. 26 is only 0.3% of the peak intensity of the pixel. This significant reduction in intensity results in minimization of the visibility of the ghost images to a viewer.

It should be noted that the stray-light only plot in FIG. 26 further illustrates the scattering of the stray light. The more scattered the stray light, the less effect the stray light has on the desired image. Thus, although some stray rays may follow identical or similar paths as occurred in the original peak and valley configuration, the amount of light that travels such paths may be substantially decreased in the flat valley configuration, thus minimizing the stray rays effects on the displayed image.

Figure 27:
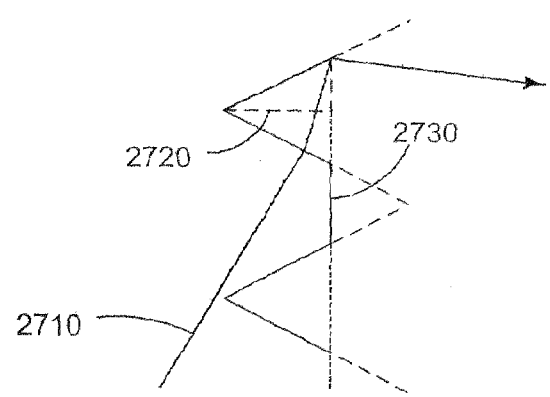
FIG. 27 is another illustration of the flat valley configuration of FIG. 22.

FIG. 27 illustrates the flat valley configuration in more detail. Although many suitable methods may be used to determine the desired valley floor depth, one exemplary method is described below. It should be appreciated that other methods may be used to determine the valley floor depth. Moreover, the valley floor depth may vary from valley to valley depending on the input angle of the main image light.

As shown in FIG. 27, the Fresnel lens may include a first sloped surface angled to receive input light (such as light as 2710). A second sloped surface may face the first sloped surface. A valley floor may link the first sloped surface to the second sloped surface. As described above, the valley floor may be configured to scatter stray light reflected from the first sloped surface.

The combination of a first sloped surface, a second sloped surface and a valley floor create a light input unit. Multiple light input units may be linked together to form the configuration shown in FIG. 22. In some embodiments, neighboring light input units may vary from each other. For example, the depth of the valley floor may vary from light input unit to light input unit or zone of light input units to zone of light input units. Moreover, in some embodiments, the light input units may be interspersed with units that include a first sloped surface directly converging with a second sloped surface.

For the purposes of the exemplary method, a useful ray depth, indicated at 2720, may be determined using an input ray, such as ray 2710. The useful ray depth may vary relative to the input ray angle. In the illustrated embodiment, the ray depth may be used to determine the depth of the valley floor at 2730. It should be appreciated that other suitable methods may be used to determine the depth of the valley floor. In the exemplary figure, a depth ratio may be calculated as follows: Depth Ratio=Useful Ray Depth/Groove Depth.

Briefly, in some embodiments, the valley floor depth may be based on a useful input ray angle. A useful input ray angle may be the angle where an image ray directed through a first sloped surface is configured to generate an image at a desired pixel, as illustrated by input ray 2710.

Figure 28:
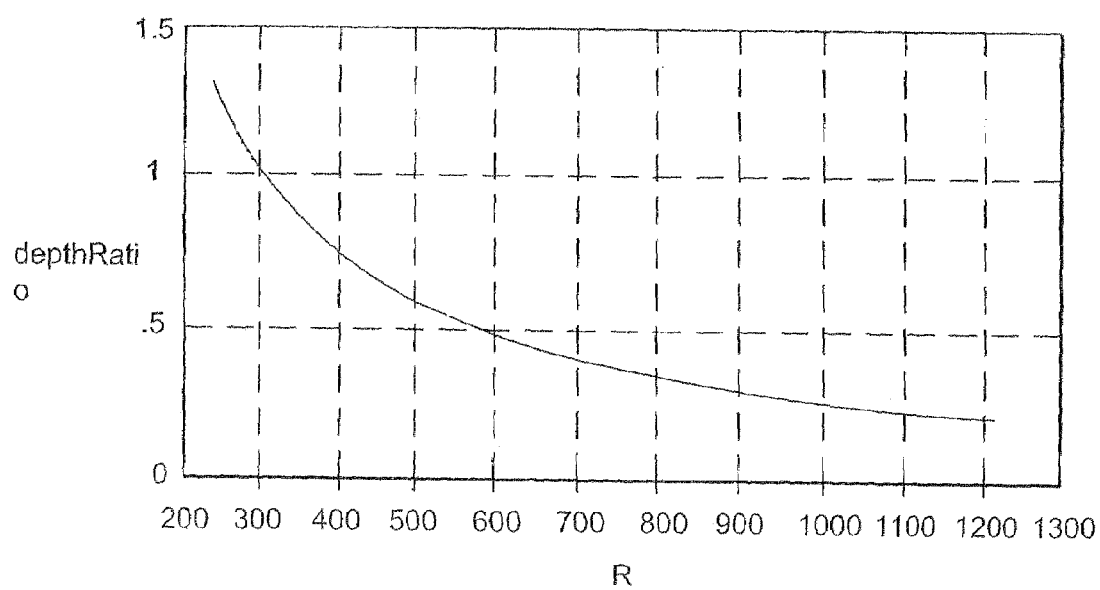
FIG. 28 provides an exemplary illustration between the depth ratio of the Fresnel lens and the radial distance from the center of the Fresnel lens according to an embodiment of the present disclosure.

FIG. 28 shows an exemplary illustration of the relationship between the Depth Ratio (described above) and the radial distance (R) from the center of a Fresnel lens. R may be considered the Fresnel radius. As illustrated, the Depth Ratio decreases as the radial distance from the center of the Fresnel lens increases. It should be appreciated that flattening the valley floor for small values of the radial distance may be ineffective because the light may miss the TIR surface for such small values, and thus, any valley flattening may not cause any significant improvement. When the depth ratio is greater than 1.0, the light may miss the TIR surface, which may cause loss of light.

Figure 29:
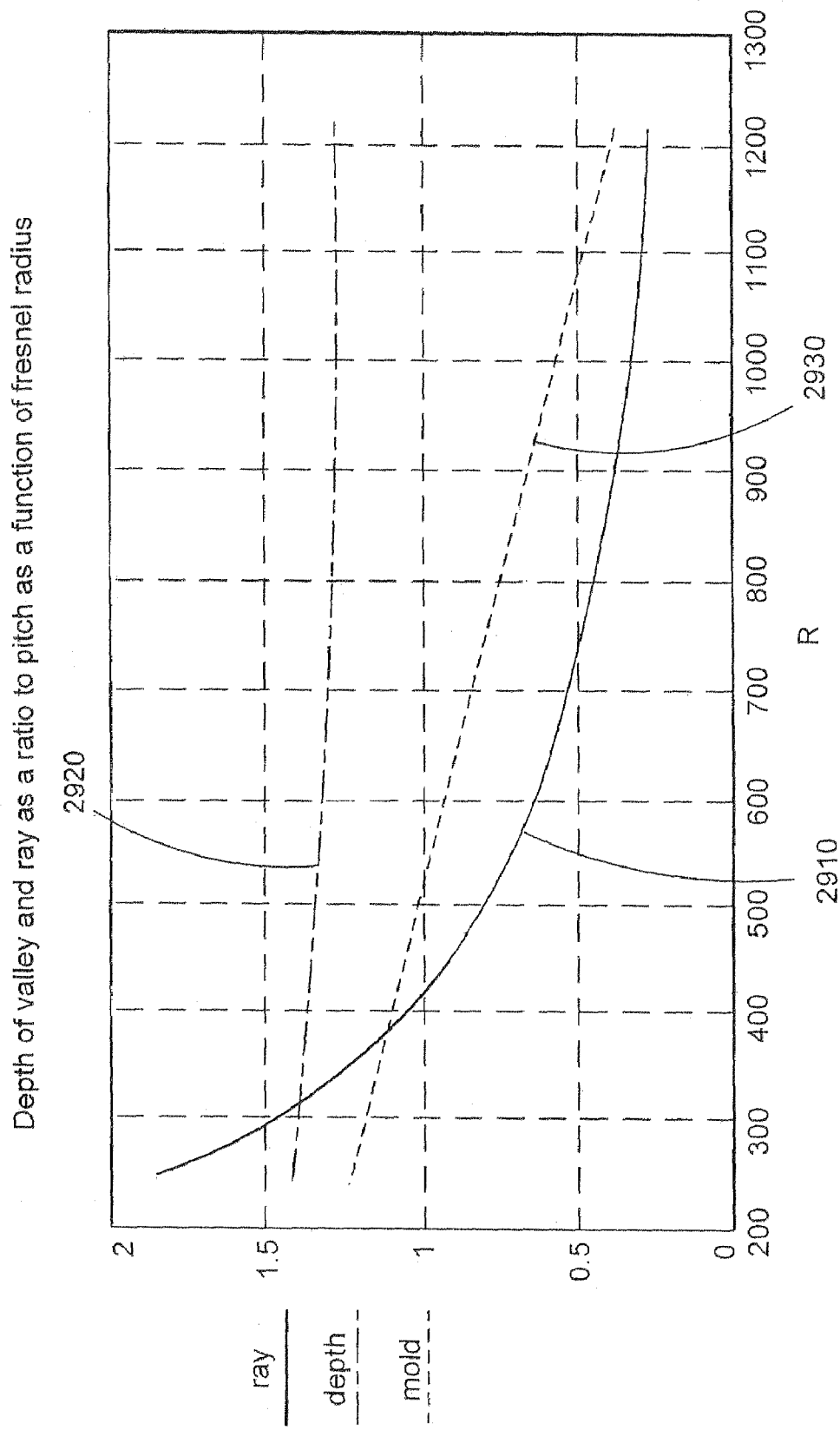
FIG. 29 provides an exemplary illustration between the depth of valley, ray and mold as a ratio to pitch of a Fresnel lens configuration as a function of the radial distance from the center of the Fresnel lens.

FIG. 29 further provides an exemplary illustration of the relationship of ray (at 2910), depth (at 2920) and mold (at 2930) of a Fresnel lens configuration as a ratio to pitch as a function of the radial distance (R) from the center of a Fresnel lens. In the illustrated embodiment, Ray 2910 is equal to Useful Ray Depth/Pitch and decreases as the radial distance increases. Depth 2920 (Original Valley Depth/Pitch) may decrease only slightly, remaining relatively constant as the radial distance increases. Mold 2930 (Flat Valley Floor Depth/Pitch) also may decrease as the radial distance increases. It should be appreciated that the relationship between depth ratio and radial distance, as well as the relationships between ray, depth and mold and radial distance, may be different in alternative embodiments, and the descriptions provided herein are provided for illustrative purposes only.

The flat valley configuration may be used in combination with diffusers or other structures configured to reduce and/or diffuse stray light. Thus, it should be appreciated that the embodiments, in whole or in part, throughout the disclosure may be combined with the flat valley configuration.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

We claim as follows:

1. A Fresnel lens for a display device, the Fresnel lens comprising:
    an input side configured to receive an image from an image projecting assembly, the input side including:
        a first facet angled to receive input light constituting at least a portion of the image,
        a second facet at least partially facing the first facet, and
        a third facet linking the first facet to the second facet;
    and an output side, opposite the input side, configured to display the image, wherein the third facet scatters light traveling from the output side to the third facet.

2. The Fresnel lens of claim 1, wherein the third facet scatters input light reflected back to the third facet from the output side.

3. The Fresnel lens of claim 1, wherein the third facet scatters ambient light traveling to the third facet through the output side.

4. The Fresnel lens of claim 1, wherein the third facet is substantially flat.

5. The Fresnel lens of claim 1, wherein the output side and the third facet are substantially parallel.

6. The Fresnel lens of claim 1, wherein the third facet is blackened.

7. The Fresnel lens of claim 1, wherein the third facet includes variable surface topography.

8. The Fresnel lens of claim 1, wherein the third facet has a depth relative to the first facet and the third facet depth is configured based on an angle where an image ray directed through the first facet generates an image at a desired pixel.

9. The Fresnel lens of claim 1, wherein the third facet has a depth relative to the first facet and the third facet depth vanes relative to a radial distance from a center of the Fresnel lens.

10. The Fresnel lens of claim 1, wherein the first facet, the second facet and the third facet collectively constitute a light input unit and where the light input unit is one of a plurality of substantially similar light input units.

11. The Fresnel lens of claim 10, wherein the third facet has a different depth relative the first facet for different light input units.

12. A display device comprising:
    a lens system to project an image;
    an intermediate mirror to reflect the image projected by the lens system;
    a back plate mirror to receive the image from the intermediate mirror and to reflect the image; and
    a Fresnel lens having an input side configured to receive the image from the back plate mirror and an output side, opposite the input side, configured to display the image, wherein the input side includes a first facet angled to receive input light constituting at least a portion of the image, a second facet at least partially facing the first facet, and a third facet linking the first facet to the second facet, wherein the third facet and the output side are substantially parallel.

13. The display device of claim 12, wherein the intermediate mirror is substantially planar.

14. The display device of claim 12, wherein the back plate mirror is substantially planar.

15. The display device of claim 12, wherein the intermediate mirror, the back plate mirror, and the output side are substantially parallel.

16. The display device of claim 12, wherein the third facet scatters input light reflected back to the third facet from the output side.

17. The display device of claim 12, wherein the third facet scatters ambient light traveling to the third facet through the output side.

18. A Fresnel lens for a display device, the Fresnel lens comprising:
    an input side configured to receive an image from an image projecting assembly, the input side including:
        a first facet angled to receive input light constituting at least a portion of the image,
        a second facet at least partially facing the first facet, and
        a third facet linking the first facet to the second facet;

and an output side, opposite the input side, configured to display the image, wherein the output side and the third facet are substantially parallel.

19. The Fresnel lens of claim 18, wherein the third facet scatters input light reflected back to the third facet from the output side.

20. The Fresnel lens of claim 18, wherein the third facet scatters ambient light traveling to the third facet through the output side.

* * * * *